(12) United States Patent  
Kasuga

(10) Patent No.: US 9,470,412 B2  
(45) Date of Patent: Oct. 18, 2016

(54) LIGHTING DEVICE

(71) Applicant: SEIKO EPSON CORPORATION, Tokyo (JP)

(72) Inventor: Hirofumi Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 125 days.

(21) Appl. No.: 13/955,414

(22) Filed: Jul. 31, 2013

(65) Prior Publication Data

US 2014/0043544 A1 Feb. 13, 2014

(30) Foreign Application Priority Data

Aug. 10, 2012 (JP) ................. 2012-178146

(51) Int. Cl.
| | |
|---|---|
| *G03B 21/10* | (2006.01) |
| *G03B 21/14* | (2006.01) |
| *F21V 33/00* | (2006.01) |
| *H04N 9/31* | (2006.01) |

(52) U.S. Cl.
CPC ........... *F21V 33/0052* (2013.01); *G03B 21/10* (2013.01); *G03B 21/145* (2013.01); *H04N 9/3141* (2013.01)

(58) Field of Classification Search
CPC .... G03B 21/14; G03B 21/10; G03B 21/145; G03B 29/00; G03B 21/56; H04N 9/3141; F21V 33/0052
USPC ..................................................... 353/74, 119
See application file for complete search history.

(56) References Cited

U.S. PATENT DOCUMENTS

| | | | |
|---|---|---|---|
| 6,736,530 B2 | 5/2004 | Thevenot | |
| 2005/0105055 A1* | 5/2005 | Olson .................... | G03B 21/14 353/30 |
| 2006/0203212 A1* | 9/2006 | Held ....................... | F21S 6/006 353/119 |
| 2007/0146647 A1* | 6/2007 | Sarayeddine ......... | G02F 1/1336 353/77 |
| 2009/0015799 A1* | 1/2009 | Luciano ......................... | 353/79 |
| 2011/0205456 A1* | 8/2011 | Mizoguchi et al. ............. | 349/5 |

FOREIGN PATENT DOCUMENTS

| | | |
|---|---|---|
| JP | 2005-527949 A | 9/2005 |
| JP | 2006-302727 | 11/2006 |
| JP | 2010-217825 A | 9/2010 |

* cited by examiner

*Primary Examiner* — William C Dowling  
*Assistant Examiner* — Ryan Howard  
(74) *Attorney, Agent, or Firm* — Maschoff Brennan

(57) ABSTRACT

A lighting device includes a lighting unit and an enclosure (e.g., a shade) configured to cover a part or all of the periphery of the lighting unit and transmit light from the lighting unit. The lighting unit includes a light source section for lighting configured to radiate light and a video forming section configured to form video light obtained by modulating, on the basis of video information, light from a light source section for video formation configured integrally with or separately from the light source section for lighting and project the video light on the enclosure.

6 Claims, 12 Drawing Sheets

LIGHTING DEVICE

The entire disclosure of Japanese Patent Application No. 2012-178146, filed Aug. 10, 2012 is expressly incorporated by reference herein.

BACKGROUND

1. Technical Field

The present invention relates to a lighting device having a lighting function and a video displaying function.

2. Related Art

There has been known a lighting device that reflects a pattern. For example, a lighting device for decoration described in JP-A-2006-302727 (Patent Literature 1) includes an imaging body having optical transparency and provided with a pattern for imaging on a curved surface, a light source configured to obliquely irradiate light toward the imaging body, and a cover provided with an opening section through which the light irradiated from the light source and transmitted through the imaging body is transmitted toward a shadow picture projection surface.

However, in the lighting device for decoration described in Patent Literature 1, to change a video to be projected, it is necessary to replace the imaging body provided with the pattern. The imaging body has to be formed of a material having optical transparency and affixed with a pattern in advance. Therefore, it is difficult to prepare imaging bodies having a variety of patterns beforehand.

SUMMARY

An advantage of some aspects of the invention is to provide a lighting device that can easily display a variety of videos.

An aspect of the invention is directed to a lighting device including: a lighting unit; and an enclosure configured to cover a part or all of the periphery of the lighting unit and transmit light from the lighting unit. The lighting unit includes: a light source section for lighting configured to radiate light; and a video forming section configured to form video light obtained by modulating, on the basis of video information, light from a light source section for video formation configured integrally with or separately from the light source section for lighting and project the video light on the enclosure.

With this configuration, the lighting unit radiates light for lighting from the light source section and projects video light based on an input video signal on the enclosure. Therefore, a user inputs a video signal and a video based on the input video signal is reflected on the enclosure. The user can easily display a variety of videos by visually recognizing the video reflected on the enclosure.

Another aspect of the invention is directed to the light device, wherein the lighting unit further includes: a light transmitting section provided in a position where the video light from the video forming section is irradiated, a transparent state and a non-transparent state of the light transmitting section being switched according to presence or absence of application of a voltage; and a control section configured to control the voltage applied to the light transmitting section according to presence or absence of projection of the video light from the video forming section. With this configuration, whereas the light for lighting is scattered and radiated, the video is clearly reflected on the enclosure. Therefore, visibility of the video is improved even when the light is used for lighting.

Still another aspect of the invention is directed to the lighting device, wherein the lighting unit further includes a projecting-direction converting section configured to change a direction of the video light projected by the video forming section and project the video light on the enclosure. With this configuration, limitation on a positional relation between the lighting unit and the enclosure is relaxed and a degree of freedom of design of the lighting device is improved.

Yet another aspect of the invention is directed to the lighting device, wherein the light source section for lighting and the light source section for video formation are configured separately, and the lighting unit includes a partition wall section configured to partition a first space in which the light source section for video formation and the video forming section are housed and a second space in which the light source section for lighting is housed. With this configuration, a function for lighting and a function for forming a video work independently from each other. Further, since light radiated as a video is clearly reflected without mixing in light radiated as lighting, visibility of the video is improved.

Still yet another aspect of the invention is directed to the lighting device, wherein the video forming section projects the video light in a direction different from a direction of light radiated as lighting by the light source section for lighting. With this configuration, since a region where the light projected as the video is reflected on the enclosure and a region where the light is reflected on the enclosure as lighting are different, visibility of the video is improved.

Further another aspect of the invention is directed to the lighting device, wherein the lighting device further includes a control section configured to switch lighting or extinguishing of the light source section for lighting or a video signal supplied to the video forming section. With this configuration, since a unit allowing the user to switch presence or absence of radiation of light and a video signal to be supplied is given to the user, convenience is improved.

Still further another aspect of the invention is directed to the lighting device, wherein the lighting device further includes a housing section configured to detachably house a communication device that accumulates a video signal, and the control section switches whether the video signal is output from the communication device to the video forming section. With this configuration, since the user can select the video signal accumulated by the communication device, convenience is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An embodiment of the invention is explained below with reference to the accompanying drawings.

Figure 1:
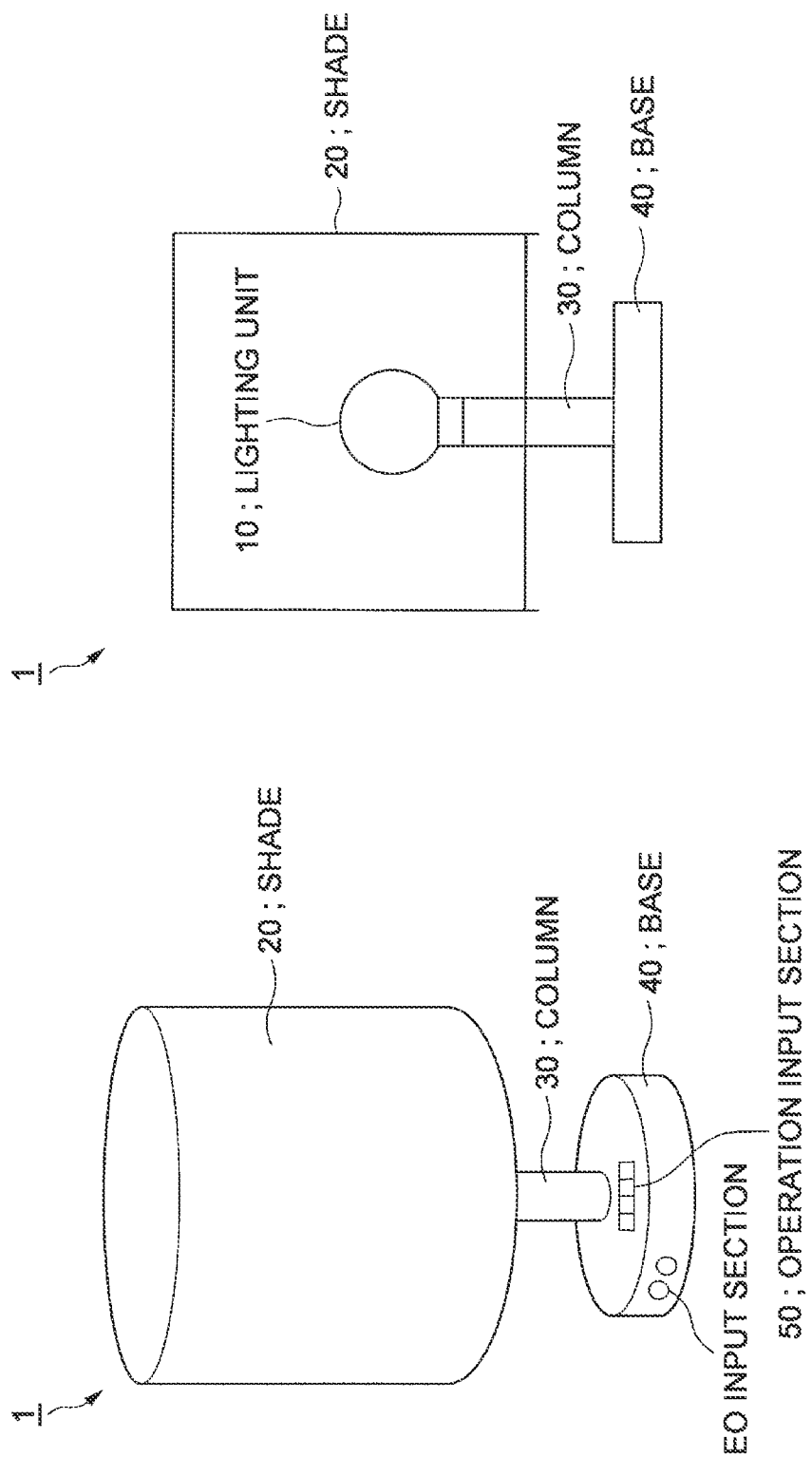
FIGS. 1A and 1B are external views showing an external appearance of a lighting device according to a first embodiment of the invention.

FIGS. 1A and 1B are external views showing an external appearance of a lighting device 1 according to this embodiment.

The lighting device 1 includes a lighting unit 10, a shade (an enclosure) 20, a column 30, a base 40, an operation input section 50, and a video input section 60.

FIG. 1A is a perspective view showing a side of the lighting device 1.

The shade 20 has, for example, a cylindrical shape. The upper surface of the shade 20 is opened and the side surface of the shade 20 surrounds the lighting unit 10. The shade 20 transmits parts of light and a video radiated by the lighting unit 10 set on the inside of the shade 20. The material of the shade 20 is not always limited to a transparent material (e.g., polyester) and may be a semitransparent material or may be a material in which fine light transmitting holes are dispersed (e.g., paper or cloth).

The column 30 has, for example, an elongated cylindrical shape. The lower end of the column 30 is supported by the base 40. The column 30 supports the shade 20 on the side surface of the column 30 and supports the lighting unit 10 at the upper end of the column 30. The column 30 supplies a video signal and electric power input from the video input section 60 to the lighting unit 10. The radius of the column 30 is smaller than the shade 20.

The base 40 has, for example, a disc shape. The base 40 supports the lower end of the column 30 in the center of the upper surface of the base 40. The base 40 includes the operation input section 50 and the video input section 60 respectively on surfaces of the base 40, for example, the upper surface and the side surface.

The operation input section 50 includes a main switch, other switches, and the like operated by a user. For example, the operation input section 50 receives an operation input by the user through the main switch and outputs a signal for switching presence or absence of the supply of electric power from the outside to the lighting unit 10 on the basis of the received operation input to a power supply circuit (not shown in the figure) via a control section (explained below). The power supply circuit includes a switch circuit configured to turn on and off the supply of the electric power. For example, when changed to a closed state according to the operation input, the switch circuit supplies the electric power to the lighting unit 10. When changed to an open state according to the operation input, the switch circuit stops the supply of the electric power. The operation input section 50 outputs a video signal supply control signal corresponding to the operation input to the control section (explained below). The video signal supply control signal is a signal indicating control of presence or absence of the supply of a video signal input from the video input section 60 and selection of any one kind of video signal among a plurality of video signals. As another example, the operation input section 50 may output an operation input signal indicating the received operation input to the lighting unit 10.

The video input section 60 receives a video signal from the outside and outputs the input video signal to the control section. The video input section 60 is, for example, a video input terminal (port).

FIG. 1B is a sectional view showing the left-right cross section of the lighting device 1. FIG. 1B indicates that the center point of the lighting unit 10 is arranged at the center point of the shade 20.

The lighting unit 10 radiates light and a video toward the inner surface of the shade 20. The side surface of the shade 20 transmits the light radiated by the lighting unit 10 and displays the video projected by the lighting unit 10 on the outside from the side surface. The light radiated by the lighting unit 10 is radiated to the outside from the top of the shade 20 as well.

Configuration Example of the Lighting Unit

A configuration example of the lighting unit 10 according to this embodiment is explained.

Figure 2:
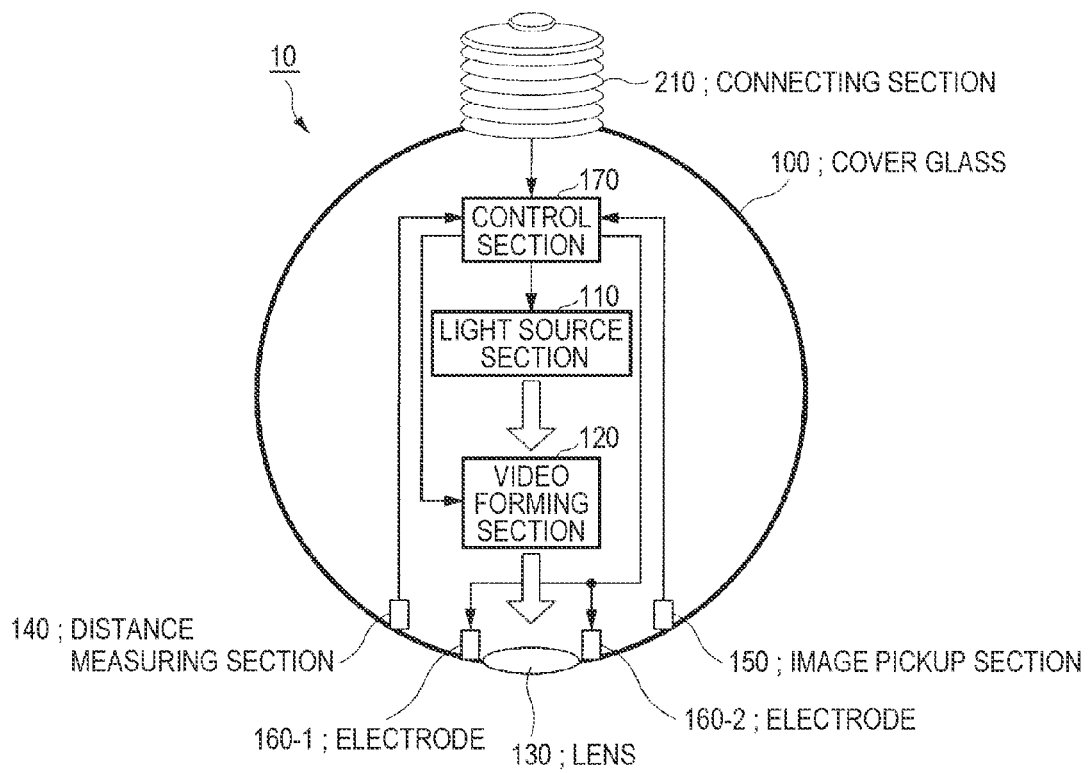
FIG. 2 is a schematic diagram showing a configuration example of a lighting unit according to the embodiment.

FIG. 2 is a schematic diagram showing a configuration example of the lighting unit 10 according to this embodiment.

The lighting unit 10 configures an optical system of the lighting device 1. The lighting unit 10 includes a cover glass 100, a light source section 110, a video forming section 120, a lens 130, a distance measuring section 140, an image pickup section 150, two electrodes 160-1 and 160-2, a control section 170, and a connecting section 210.

The cover glass 100 has a substantially spherical shape. One end of the cover glass 100 is sealed by the connecting section 210. The light source section 110, the video forming section 120, the lens 130, the distance measuring section 140, the image pickup section 150, the electrodes 160-1 and 160-2, and the control section 170 are housed on the inside of the cover glass 100 and covered by the cover glass 100. The cover glass 100 radiates light radiated by the light source section 110.

The light source section 110 receives the supply of electric power via the connecting section 210, emits light to the video forming section 120, and radiates the light to the cover glass 100. That is, the light source section 110 is a light source for lighting in the lighting unit 10. The light source section 110 also functions as a light source for video formation of video light projected by the video forming section 120. That is, in this example, in the light source section 110, the light source for lighting and the light source for video formation are integrally configured. The configuration of the light source section 110 is explained below.

The video forming section 120 modulates light made incident from the light source section 110 according to a video signal input from the control section 170 to form video light representing a video and emits the formed video light to the lens 130. The video forming section 120 includes, for example, a liquid crystal light modulating element configured to emit full-color video light. When a video signal is not input from the control section 170 and light is made incident from the light source section 110, the incident light is emitted to the lens 130 without being modulated (e.g., while being kept as white light).

The video forming section 120 may include a color filter (not shown in the figure). The color filter is configured by, for example, a Bayer-array color filter including a reflective dichroic filter. The color filter has a function of a color separation optical system that separates light made incident from the light source section 110 into red light, green light, and blue light for each of pixels. In this embodiment, the color separation optical system is not limited to an RGB colorimetric system including three colors of red, green, and blue. Other color separation optical systems, for example, a YMC colorimetric system may be used.

The video forming section 120 may include sheet polarizers (not shown in the figure), polarization directions of which are orthogonal to each other on both of a surface on which light is made incident from the light source section 110 and a surface from which video light for each of the colors is emitted. It is possible to extract a component of each of the colors, perform light modulation for the extracted components of each of the colors, and emit video light.

The lens 130 transmits image light made incident from the video forming section 120. The lens 130 is arranged such that the lens 130 is focused on the inner surface of the shade 20, which is a projection surface, and the direction of the optical axis of the lens 130 is substantially perpendicular to the inner surface of the shade 20. The thickness of the lens 130 is variable based on the voltage between the electrodes 160-1 and 160-2 provided at both ends of the lens 130. As explained below, a focal length of the lens 130 may be adjusted to a distance measured by the distance measuring section 140 as explained below. Consequently, even if the distance between the lens 130 and the shade 20 is variable, it is possible to adjust the focal length (focus adjustment) and enlarge and project a video formed on the projection surface by the video forming section 120.

When the distance between the lens 130 and the shade 20 is fixed, the thickness of the lens 130 may be set in advance such that a focal length corresponding to the distance between the lens 130 and the shade 20 is obtained. In that case, processing for setting the voltage between the electrodes 160-1 and 160-2 can be omitted.

The distance measuring section 140 measures a distance to the projection surface and outputs distance data indicating the measured distance to the control section 170. A direction in which the distance measuring section 140 measures the distance is a direction same as the direction of the optical axis of the lens 130. The distance measuring section 140 is, for example, an infrared laser distance meter that uses an electromagnetic wave in a band (an infrared ray, etc.) other than a visible ray.

When an operation input signal input from the operation input section 50 via the control section 170 is a signal indicating photographing of a video, the image pickup section 150 photographs a video in the optical axis direction and outputs a photographed video signal indicating the photographed video to the control section 170. The direction of the optical axis of the image pickup section 150 is a direction same as the optical axis direction of the lens 130. The image pickup section 150 is, for example, a CCD image sensor (Charge Coupled Device Image Sensor). In this embodiment, the image pickup section 150 may be omitted.

The electrodes 160-1 and 160-2 are set at one end of the lens 130 and the other end opposed to the one end. A voltage is applied from the control section 170 between the ends. Consequently, the thickness of the lens 130 is changed to adjust the focal length.

The control section 170 outputs a video signal input from the video input section 60 via the connecting section 210 to the video forming section 120. When a photographed video signal is input from the image pickup section 150, the control section 170 may output the input photographed video signal to the video forming section 120 and project a video based on the photographed video signal.

The control section 170 controls, on the basis of a video signal supply control signal input from the operation input section 50, whether the video signal input from the video input section 60 is output (supplied) to the video forming section 120. When a plurality of video signals are input to the control section 170, the control section 170 selects, on the basis of the input video signal supply control signal, a video signal to be output to the video forming section 120.

The control section 170 sets, on the basis of a distance indicated by distance data input from the distance measuring section 140, a value of a voltage (a voltage value) applied between the electrodes 160-1 and 160-2. For example, voltage control data indicating a correspondence relation between distances and voltage values is stored in the control section 170 in advance. The control section 170 sets a voltage value corresponding to a distance indicated by input distance data. The control section 170 applies the voltage of the set voltage value between the electrodes 160-1 and 160-2.

In this embodiment, the control section 170 does not always have to be included in the lighting unit 10 and may be included in a main body section such as the column 30 or the base 40. For example, the control section 170 may be integrated with the operation input section 50 or the video input section 60.

The connecting section 210 is connected to the upper end of the column 30. The connecting section 210 supplies supplied electric power to the light source section 110 and outputs a video signal input from the video input section 60 to the video forming section 120. An external appearance and a function (for supplying supplied electric power to the light source section) of the connecting section 210 may be the same as those of a connecting section provided at the end of an incandescent light bulb, a bulb-type fluorescent lamp, or a bulb-type LED lamp in the past. The example shown in FIG. 2 is a configuration for screwing and connecting the entire lighting unit 10 to the upper end of the column 30 while rotating the lighting unit 10.

In this embodiment, the connecting section 210 may be omitted. The other components of the lighting unit 10 may be directly connected to the column 30.

With the configuration explained above, light generated by supplied electric power is modulated by an input video signal to form an image. The formed image is projected on the shade 20. The user can visually recognize the projected image. Consequently, by changing a video signal to be input, it is possible to change a video signal to be projected. Therefore, a lighting device that can easily display a variety of videos is provided.

Example of the Configuration of the Light Source Section

The configuration of the light source section 110 according to this embodiment is explained.

Figure 3:
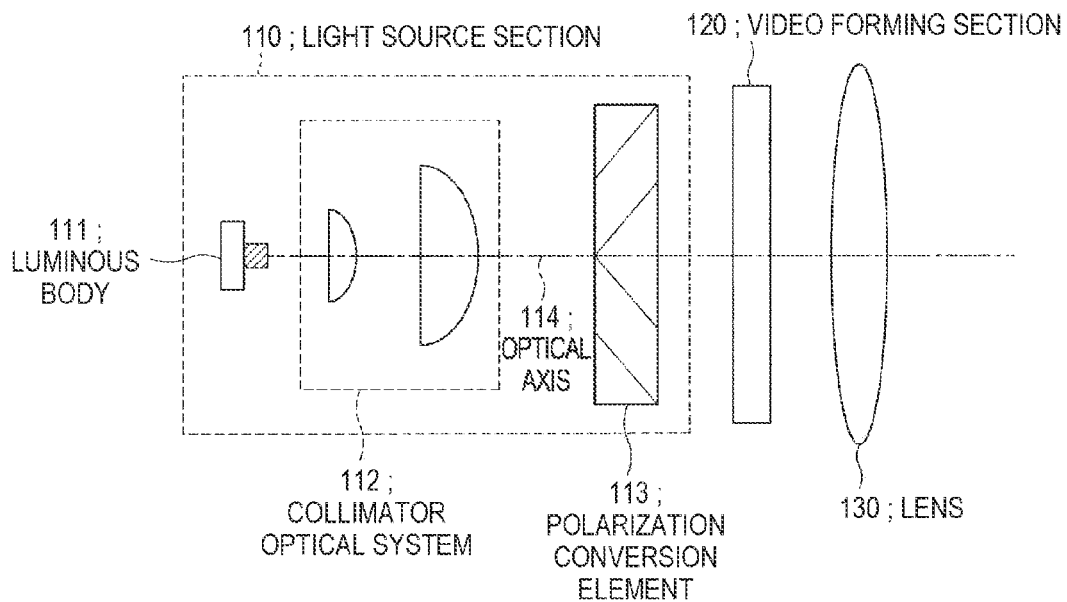
FIG. 3 is a schematic diagram showing the configuration of a light source section according to the embodiment.

FIG. 3 is a schematic diagram showing the configuration of the light source section 110 according to this embodiment.

The light source section 110 includes a luminous body 111, a collimator optical system 112, and a polarization conversion element 113. An optical axis 114 of these components is arranged on a straight line same as the optical axis of the video forming section 120 and the optical axis of the lens 130.

The luminous body 111 emits light to the collimator optical system 112 with supplied electric power. The luminous body 111 is, for example, a white light emitting diode that emits white light including components of red light, green light, and blue light.

The collimator optical system 112 is an optical element that parallelizes light made incident from the luminous body 111 and emits the parallelized light to the polarization conversion element 113.

The polarization conversion element 113 subjects light made incident from the collimator optical system 112 to polarization conversion and emits the light subjected to the polarization conversion to the video forming section 120. The polarization conversion element 113 includes a polarization separation layer that transmits one linearly polarized light component in the incident light and reflects the other linearly polarized light component in a direction perpendicular to the optical axis 114, a reflection layer that reflects the other linearly polarized light component, which is reflected by the polarization separation layer, in a direction parallel to the optical axis 114, and a phase difference plate that converts the other linearly polarized light component, which is reflected by the reflection layer, into a polarized light component same as the one linearly polarized light component.

In this embodiment, a digital mirror device (DMD) may be used as the video forming section 120. The DMD reflects light from the light source section 110 and guides light formed as video light to the lens 130. Therefore, unlike the example shown in FIG. 3, the optical axis 114 of the light source section 110 is not on a straight line same as the optical axis of the video forming section 120 and the lens 130. The DMD is a display element in which a large number of micro-mirrors are arrayed on a plane. The micro-mirrors are controlled whether to reflect the light from the light source section 110 or not according to whether a voltage is applied to the micro-mirrors. Light and shade of a video are represented by changing a control time interval of the voltage in the micro-mirrors and a ratio of time when the voltage is applied and time when the voltage is not applied. A color video is represented by transmitting input light through a rotary color filter that transmits any one color component among a plurality of color components included in the input light and switching a color at a frequency higher than a frame frequency.

Another Configuration Example "a" of the Lighting Unit

As another configuration example "a" of the lighting unit 10, a lighting unit 10a is explained. In the lighting unit 10a, components same as those in the lighting unit 10 are denoted by the same reference numerals and signs.

Figure 4:
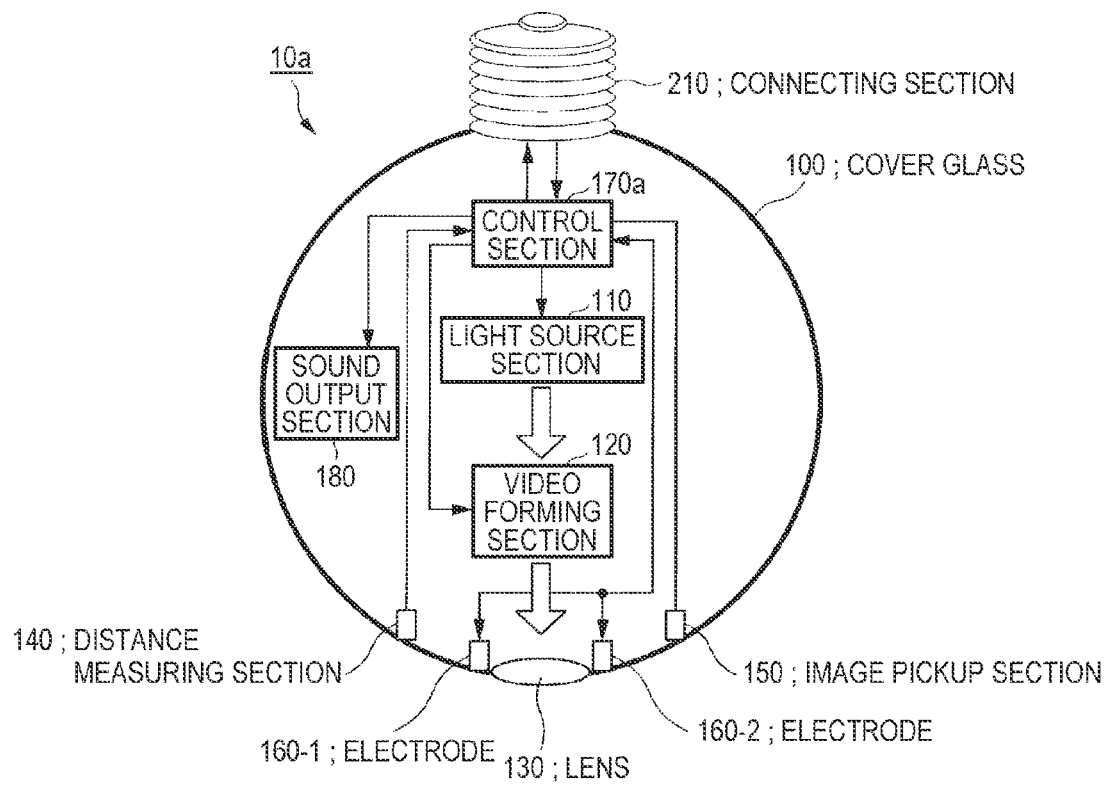
FIG. 4 is a schematic diagram showing another configuration example of the lighting unit according to the embodiment.

FIG. 4 is a schematic diagram showing another configuration example "a" of the lighting unit according to this embodiment (the lighting unit 10a).

The lighting unit 10a includes a sound output section 180 in addition to the components included in the lighting unit 10 and includes a control section 170a instead of the control section 170.

The control section 170a performs processing same as the processing by the control section 170. Besides, when a sound signal is included in a video signal input from the video input section 60, the control section 170a extracts the sound signal from the video signal and outputs the extracted sound signal to the sound output section 180. When the lighting device 1 includes a sound input section (not shown in the figure) to which a sound signal is input, the control section 170a may output the sound signal input from the sound input section to the sound output section 180. In that case, the control section 170a may switch presence or absence of the supply of the sound signal in association with presence or absence of the supply of the video signal.

The sound output section 180 reproduces sound based on the sound signal input from the control section 170a. The sound output section 180 is, for example, an electrostriction speaker that changes in a shape according to an input voltage to thereby generate vibration.

Consequently, since sound based on the input sound signal is reproduced in association with a projected video, it is possible to increase the interest of the user.

Another Configuration Example "b" of the Lighting Unit

As another configuration example "b" of the lighting unit 10, a lighting unit 10b is explained. In the lighting unit 10b, components same as those in the lighting unit 10 are denoted by the same reference numerals and signs.

Figure 5:
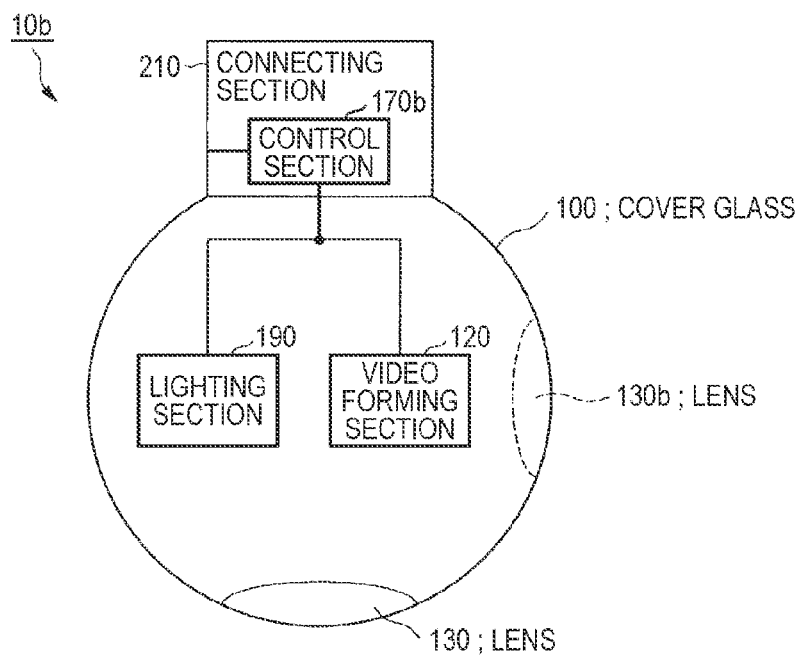
FIG. 5 is a schematic diagram showing still another configuration example of the lighting unit according to the embodiment.

FIG. 5 is a schematic diagram showing another configuration example "b" of the lighting unit according to this embodiment (the lighting unit 10b).

The lighting unit 10b includes a control section 170b instead of the control section 170 and includes a lighting section (a light source section for lighting) 190 separately from the light source section (a light source section for video projection) 110. Consequently, it is possible to independently control lighting or extinguishing of a light and display or non-display of a video. The light source section 110 is integrated with the video forming section 120 and is not shown in FIG. 5.

The control section 170b performs processing same as the processing by the control section 170.

A broken line on the right side in the cover glass 100 shown in FIG. 5 indicates a lens 130b, which is another arrangement example of the lens 130. In this example, the lens 130 may be omitted and the video forming section 120 may project a video to the right. The projected video is transmitted through the lens 130b and projected on the inner surface of the shade 20. Therefore, the video forming section 120 may be arranged with the direction of the optical axis set to the right. Alternatively, a mirror surface (not shown in the figure) for reflecting the projected video may be provided on the front surface of a projection port for the video to change the direction of the video from the downward direction to the right direction while the direction of the optical axis is kept downward. When the distal end of the lighting unit 10b is faced up and fixed as in the lighting unit 10 shown in FIG. 1B, the lighting device 1 can display an image on the side of the shade 20.

Figure 6:
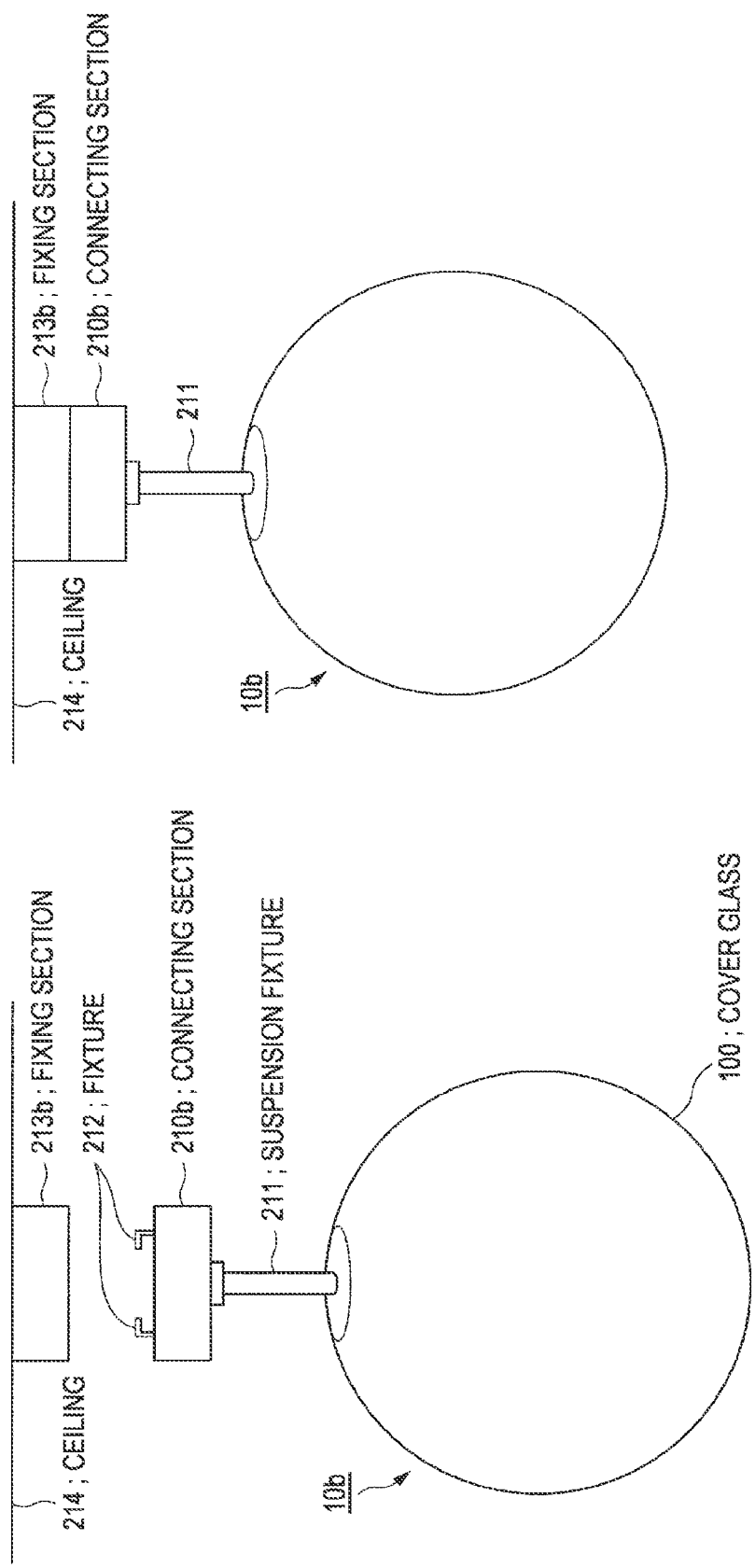
FIGS. 6A and 6B are schematic diagrams showing a setting example of the lighting unit according to the embodiment.

FIGS. 6A and 6B are schematic diagrams showing a setting example of the lighting unit 10b according to this embodiment.

In FIGS. 6A and 6B, the lighting unit 10b includes a connecting section 210b instead of the connecting section 210. The lighting unit 10b is suspended from, for example, an indoor ceiling 214. The connecting section 210b is connected to one end of an elongated cylindrical suspension fixture 211. The other end of the suspension fixture 211 seals one end of the cover glass 100.

FIG. 6A shows a state in which the lighting unit 10b according to this embodiment is not attached to the ceiling 214.

Fixtures 212 to be engaged with a fixing section 213b are provided on the upper surface of the connecting section 210b.

Holes with which the fixtures 212 are engaged are provided on the bottom surface of the fixing section 213b. The upper surface of the fixing section 213b adheres to the ceiling 214.

FIG. 6B shows a state in which the lighting unit 10b according to this embodiment is attached to the ceiling 214.

The connecting section 210b and the fixing section 213b are connected via the fixtures 212. The fixtures 212 are formed of a material having rigidity and electrical conductivity, for example, metal. Consequently, electric power and a video signal are supplied to the lighting unit 10b from the outside via the fixtures 212 engaged with the fixing section 213b. In that case, for example, a conductor wire (not shown in the figure) for transmitting the electric power and the video signal between the operation input section 50 and the video input section 60 and between the operation input section 50 and the fixing section 213b may be provided on the wall surface. The shade 20 (not shown in the figure) may be connected to the ceiling 214 to surround the lighting unit 10b to display a video on the side surface or the bottom surface of the shade 20. A material (e.g., frosted glass) having light scattering properties higher than the light scattering properties of a transparent material and having transmittance lower than the transmittance of the transparent material may be used as the material of the cover glass 100 and caused to function as the shade 20.

Another Configuration Example "c" of the Lighting Unit

As another configuration example "c" of the lighting unit 10, a lighting unit 10c is explained. In the lighting unit 10c, components same as those in the lighting unit 10 are denoted by the same reference numerals and signs.

Figure 7:
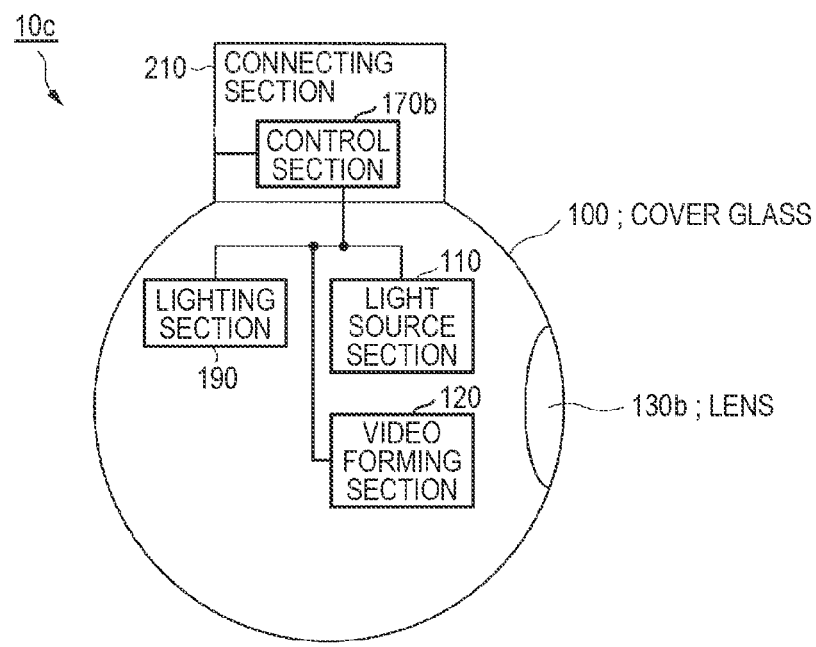
FIG. 7 is a schematic diagram showing still another configuration example of the lighting unit according to the embodiment.

FIG. 7 is a schematic diagram showing another configuration example "c" of the lighting unit according to this embodiment (the lighting unit 10c).

In the lighting unit 10c, the light source section (the light source section for video projection) 110 and the lighting section (the light source section for lighting) 190 of the lighting unit 10b are separately configured.

A solid line on the right side of the cover glass 100 shown in FIG. 7 indicates a lens 130b, which is another configuration example of the lens 130. In this case, the lens 130 may be omitted and the video forming section 120 may be configured to project a video on the inner surface of the shade 20 via the lens 130b. When the distal end of the lighting unit 10b is faced up as shown in FIG. 1B, the lighting device 1 can display an image on the side of the shade 20.

Another Configuration Example "d" of the Lighting Unit

As another configuration example "d" of the lighting unit 10, a lighting unit 10d is explained. In the lighting unit 10d, components same as those in the lighting unit 10 are denoted by the same reference numerals and signs.

Figure 8:
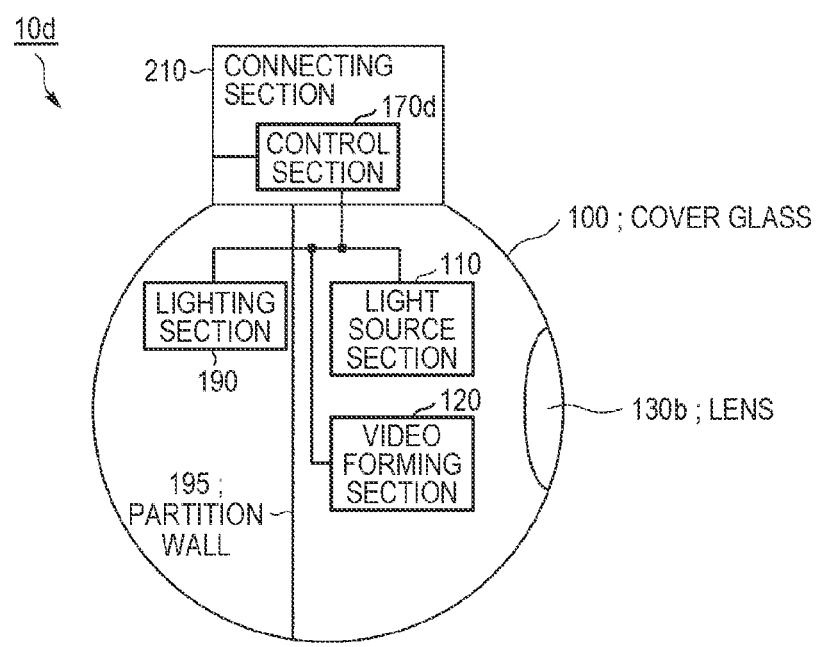
FIG. 8 is a schematic diagram showing still another configuration example of the lighting unit according to the embodiment.

FIG. 8 is a schematic diagram showing another configuration example "d" of the lighting unit according to this embodiment (the lighting unit 10d).

The lighting unit 10d further includes a partition wall (a partition wall section) 195 in the configuration of the lighting unit 10c.

The partition wall 195 partitions the inner space of the cover glass 100 into two spaces. The light source section (the light source section for video formation) 110 and the video forming section 120 are housed in one space (a first space) of the two spaces. The lighting section (the light source section for lighting) 190 are housed in the other space (a second space). That is, the lighting section 190 is configured as a light source separate from the light source section 110. The partition wall 195 is formed of a material for preventing light by a video projected by the video forming section 120 from leaking to the second space in which the lighting section 190 is housed and preventing light radiated by the lighting section 190 from leaking to the first space in which the light source section 110 and the video forming section 120 are housed. Consequently, since the light radiated by the lighting section 190 is not irradiated on the video projected by the video forming section 120, the video is clearly displayed. The lighting unit 10d can be properly used according to a direction. For example, the lighting unit 10d displays a video in one direction and lights the lighting section 190 in the other direction. A configuration example of a lighting device (a lighting device 1i) including the lighting unit 10d is explained below.

Another Configuration Example "e" of the Lighting Unit

As another configuration example "e" of the lighting unit 10, a lighting unit 10e is explained. In the lighting unit 10e, components same as those in the lighting unit 10 are denoted by the same reference numerals and signs.

Figure 9:
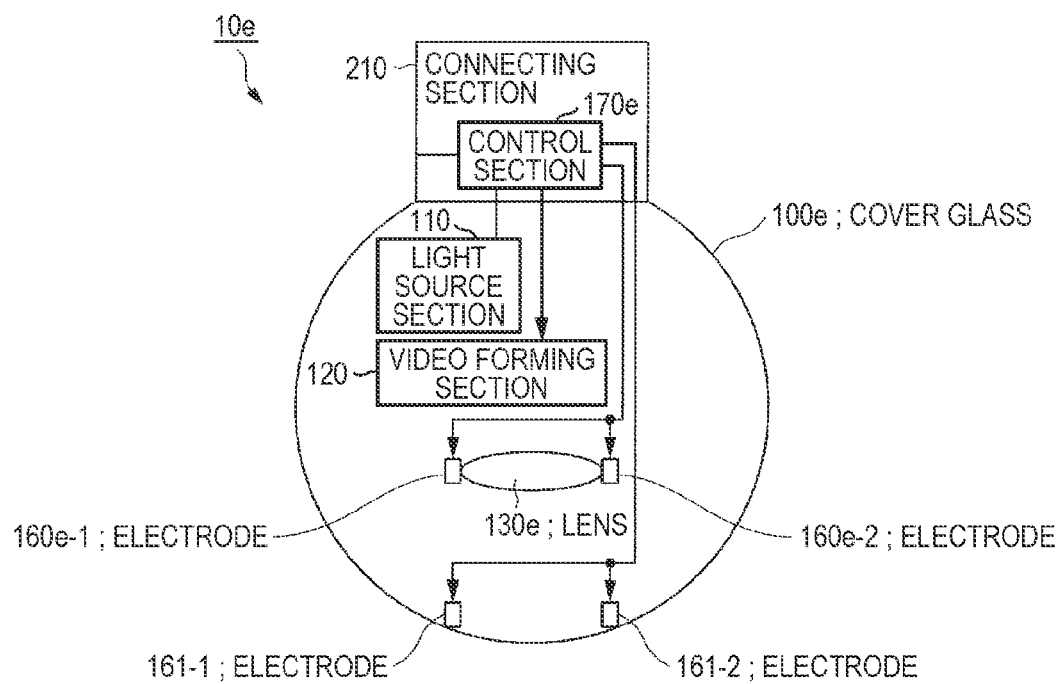
FIG. 9 is a schematic diagram showing still another configuration example of the lighting unit according to the embodiment.

FIG. 9 is a schematic diagram showing another configuration example "e" of the lighting unit according to this embodiment (the lighting unit 10e).

The lighting unit 10e includes a cover glass (a light transmitting section) 100e, a lens (a light transmitting section) 130e, and a control section 170e instead of the cover glass 100, the lens 130, and the control section 170 in the configuration of the lighting unit 10 and further includes electrodes 160e-1 and 160e-2 and electrodes 161-1 and 161-2. A position where the lens 130e is provided is closer to the video projection surface of the video forming section 120 than the cover glass 100e.

The material of the cover glass 100e and the lens 130e includes a substance, a refractive index of which changes according to an applied voltage. Examples of such a substance include PDLC (Polymer Dispersed Liquid Crystal). When a voltage is not applied to the PDLC, the PDLC is clouded, that is, light scatters on the surface of the PDLC and the PDLC is visually recognized as opaque white because the refractive index is higher than the refractive index of the atmosphere. On the other hand, when a voltage is applied to the PDLC, since the refractive index is substantially equal to the refractive index of the atmosphere, light does not scatter on the surface of the PDLC and the PDLC is visually recognized as transparent. That is, the cover glass 100e and the lens 130e are provided in positions where a video from the video forming section 120 is irradiated. Transparent and non-transparent states of the cover glass 100e and the lens 130e are switched according to presence or absence of application of a voltage. A degree of the cloudiness changes according to not only the refractive index but also the applied voltage.

The electrode 160e-1 is provided at one end of the lens 130e and the electrode 160e-2 is provided at the other end of the lens 130e. The electrode 161-1 is provided in one region of the cover glass 100e and the electrode 161-2 is provided in the other region of the cover glass 100e.

The control section 170e performs processing same as the processing by the control section 170. Beside, when a video signal is input from the video input section 60, the control section 170e applies a voltage between the electrodes 160e-1 and 160e-2 and applies a voltage between the electrodes 161-1 and 161-2 to thereby make the lens 130e and the cover glass 100e transparent.

When the input of the video signal from the video input section 60 is stopped, the control section 170e stops the application of the voltage between the electrodes 160e-1 and 160e-2 and stops the application of the voltage between the electrodes 161-1 and 161-2 to thereby cloud the lens 130e and the cover glass 100e.

When the lighting unit 10e is caused to function for radiation of light, that is, lighting, the cover glass 100e and the lens 130e are clouded. Light radiated by the light source section 110 scatters in the lens 130e and the cover glass 100e. Deviation does not occur in illuminance in each of radiating directions. Therefore, it is possible to prevent a phenomenon in which illuminance in a specific radiating direction is higher than illuminance in the other radiating directions (so-called hot spot, LED eye-ball, etc.).

On the other hand, when the lighting unit 10e projects a video, since the cover glass 100e and the lens 130e are transparent, it is possible to project the video without losing sharpness of the video.

In the above explanation, the lens 130e and the cover glass 100e are switched to be transparent or cloudy and timings for the switching are the same. However, this modification is not limited to this. For example, only one of the lens 130e and the cover glass 100e may be switched to be transparent or cloudy. When electric power is supplied to the light source section 110 and a video signal is not output to the video forming section 120, the control section 170e may control, on the basis of an operation input signal input from the operation input section 50, whether a voltage is applied between the electrodes 161-1 to 161-2. However, electric power is not supplied to the lens 130e. It is possible to perform control to scatter light in a part of a region by clouding the cover glass 100e and the lens 130e, scattering light in the entire space, or clouding the cover glass 100e and keeping only the lens 130e clouded. Besides, the control section 170e can continuously change the voltage between the electrodes 161-1 and 161-2 on the basis of an operation signal and change a degree of cloudiness of the cover glass 100e, that is, a degree of scattering of light.

As explained above, in this modification, it is possible to increase interest by adjusting a degree of scattering of light used for lighting and presence or absence of scattering to a part of regions while realizing both the functions of the lighting and the video display.

Another configuration example "f" of the lighting device

Another configuration example "f" of the lighting device 1 (a lighting device 1f) is explained. In the lighting device 1f, components same as those in the lighting device 1 are denoted by the same reference numerals and signs.

Figure 10:
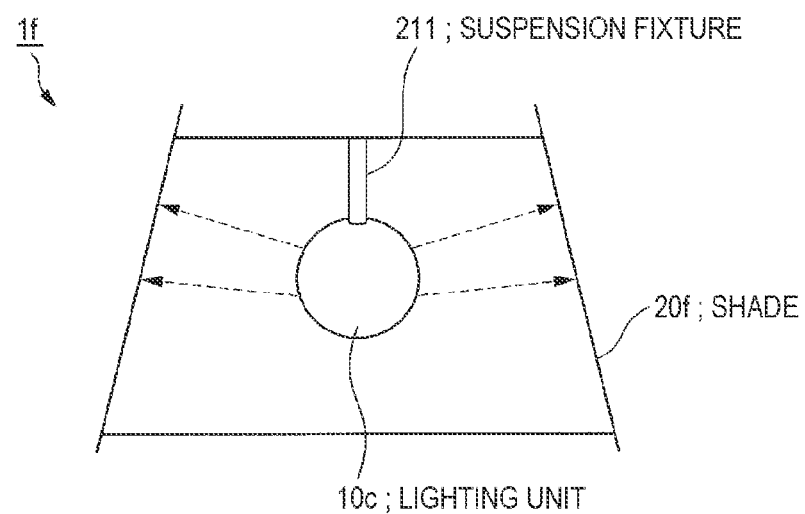
FIG. 10 is a sectional view showing the configuration of the lighting device according to the embodiment.

FIG. 10 is a sectional view showing the configuration of the lighting device 1f according to this embodiment.

The lighting device 1f includes the lighting unit 10c, a shade 20f, and the suspension fixture 211. The configuration of the lighting device 1f is the same as the configuration of the lighting device 1 except that the shade 20f is different from the shade 20 (FIGS. 1A and 1B) in a shape and the arrangement of the lighting unit 10c provided instead of the lighting unit 10 is different.

The shade 20f has a substantially circular truncated cone shape. The center point of the lighting unit 10c is located at the center point of the shade 20f. The shade 20f is arranged to surround the entire lighting unit 10c. Light radiated from the lighting unit 10c is radiated in all directions. A part of the light is transmitted through the shade 20f. On the other hand, a video (indicated by broken lines) projected from the lighting unit 10c is projected substantially perpendicularly to the inside of the side surface of the shade 20f. The video is displayed on the outside of the shade 20f. Consequently, the user can visually recognize the video reflected on the side surface of the shade 20f.

Another configuration example "g" of the lighting device

Another configuration example "g" of the lighting device 1 (a lighting device 1g) is explained. In the lighting device 1g, components same as those in the lighting device 1 are denoted by the same reference numerals and signs. The lighting device 1g is an example including a plurality of lighting units 10 each including the light source section 110 and the video forming section 120. In this example, the number of lighting units 10 is two. Reference signs 10-1 and 10-2 are respectively affixed to the two lighting units to distinguish the lighting units.

Figure 11:
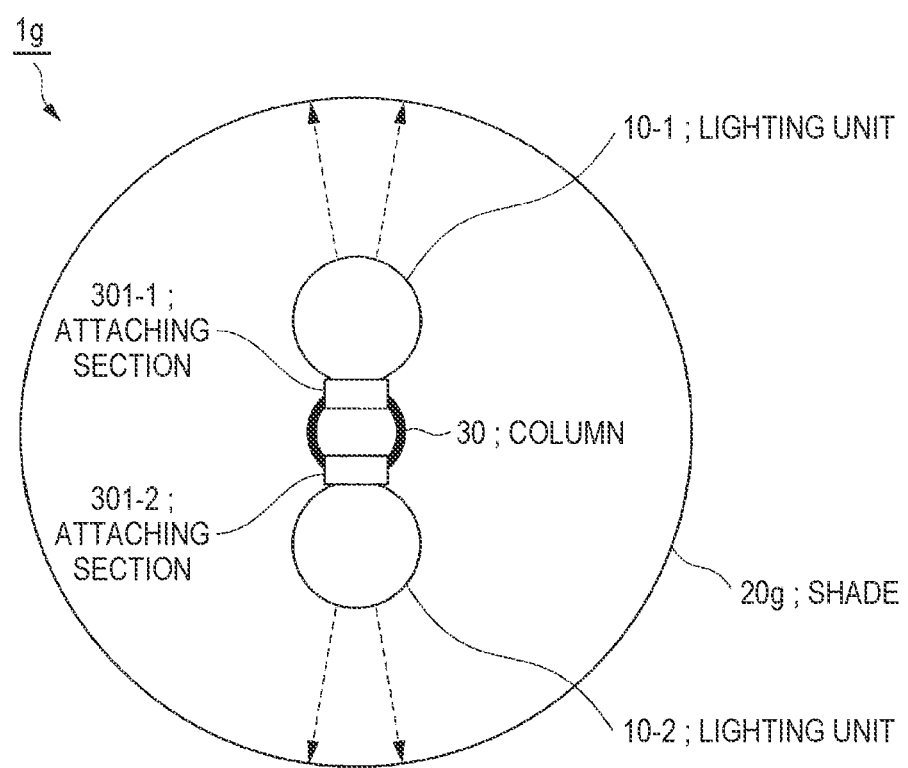
FIG. 11 is a top view showing the configuration of the lighting device according to the embodiment.

FIG. 11 is a top view showing the configuration of the lighting device 1g according to this embodiment.

FIG. 11 shows a view equivalent to a surface of the lighting device 1 shown in FIGS. 1A and 1B overlooked from above.

The lighting device 1g includes lighting units 10-1 and 10-2 and a shade 20g instead of the lighting unit 10 and the shade 20 of the lighting device 1 (FIGS. 1A and 1B) and further includes attaching sections 301-1 and 301-2.

The lighting units 10-1 and 10-2 respectively radiate videos (indicated by broken lines) in opposite directions. The lighting units 10-1 and 10-2 are set in a direction parallel to the horizontal plane. The lighting units 10-1 and 10-2 are fixed to the upper end of the column 30 respectively by the attaching sections 301-1 and 301-2. The shade 20g has a substantially cylindrical shape. In this modification, the side surface of the shade 20g may have a bellows-like surface, the radius of which periodically changes, instead of a smooth surface, the radius of which is substantially fixed in the circumferential direction.

The shade 20g is arranged such that the center point of both the lighting units 10-1 and 10-2 is located at the center point of the shade 20g and the shade 20g surrounds the entire lighting units 10-1 and 10-2. Lights radiated from the lighting units 10-1 and 10-2 are made incident on the inside of the side surface of the shade 20g and radiated to the outside. Consequently, videos projected by the lighting units 10-1 and 10-2 are visually recognized respectively in different directions from the outside of the lighting device 1g.

Video signals in two or more systems may be input to the video input section 60. Control sections respectively included in the lighting units 10-1 and 10-2 may be configured to select any one or two systems among the input video signals.

The operation input section 50 may be configured to receive an operation input indicating which light of the lighting units 10-1 and 10-2 is lit. Electric power may be supplied to the lighting unit 10-1 or 10-2 to be lit.

In the example explained above, the lighting device 1g includes the two lighting units 10-1 and the like. However, this modification is not limited to this. The lighting device 1g may include more than two (e.g., three) lighting units 10-1 and the like.

The lighting device 1g may include a plurality of lighting units 10-1 and the like. Besides, one lighting unit 10 may include a plurality of video forming sections 120. The video forming sections 120 may be set to radiate videos respectively in different directions.

Consequently, in this modification, a plurality of videos are respectively displayed in different directions. For example, one user can simultaneously visually recognize the plurality of videos. A plurality of users can respectively visually recognize desired videos.

Another Configuration Example "h" of the Lighting Device

A lighting device 1h, which is another configuration example of the lighting device 1, is explained. In the lighting device 1h, components same as the components of the lighting device 1 are denoted by the same reference numerals and signs.

Figure 12:
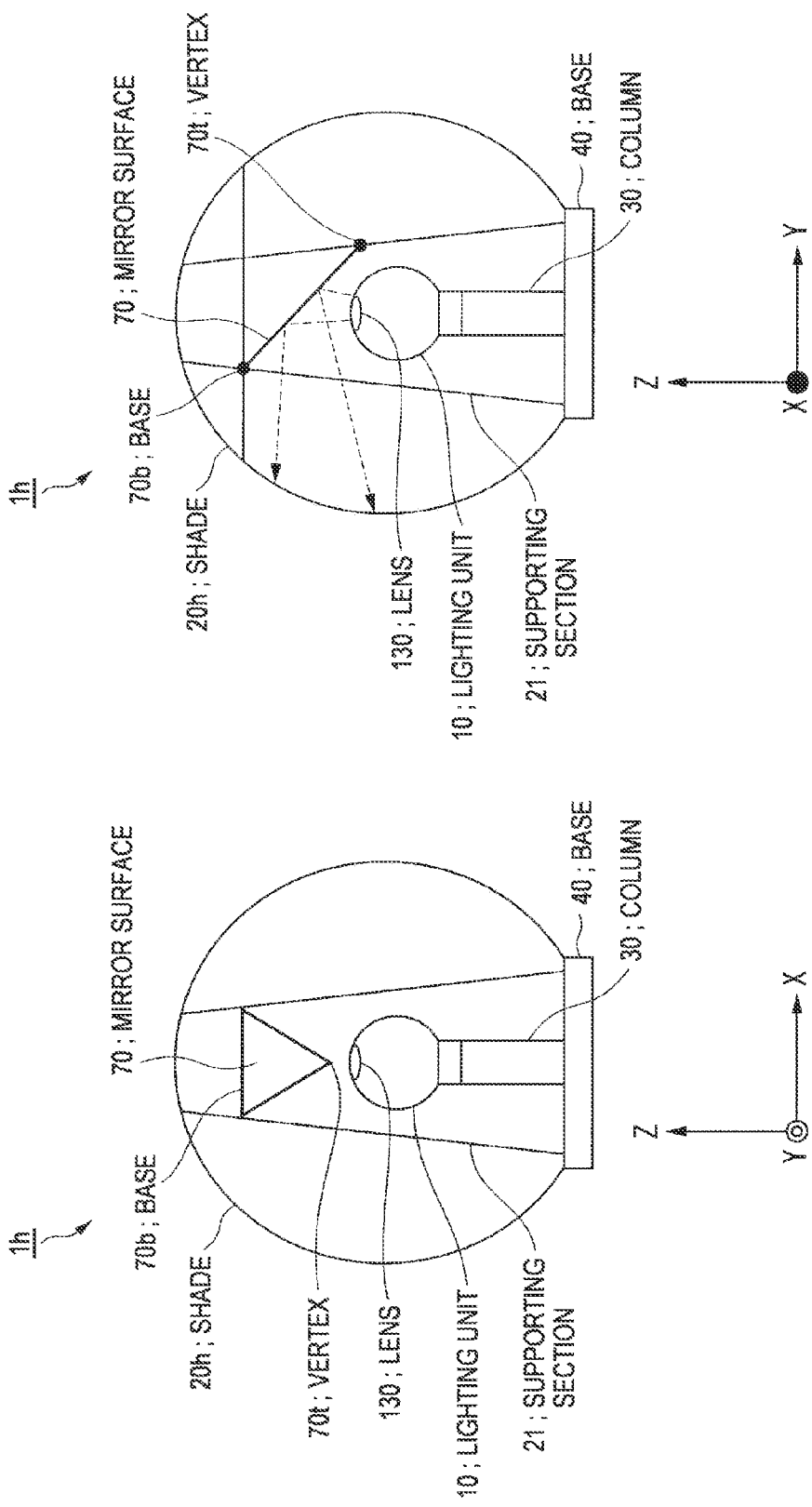
FIGS. 12A and 12B are schematic diagrams showing the configuration of the lighting device according to the embodiment.

FIGS. 12A and 12B are schematic diagrams showing the configuration of the lighting device 1h according to this embodiment.

The lighting device 1h includes a shade 20h instead of the shade 20 of the lighting device 1 (FIGS. 1A and 1B) and further includes a supporting section 21 and a mirror surface 70 as a projecting-direction converting section.

FIG. 12A is a perspective view of the lighting device 1h according to this embodiment.

In FIG. 12A, a Z direction indicates a direction of the height of the lighting device 1h. An X direction and a Y direction are two directions perpendicular to the Z direction and orthogonal to each other.

FIG. 12B is a sectional view of the lighting device 1h according to this embodiment.

The shade 20h has a substantially spherical shape. For example, the shade 20h is arranged to surround the entire lighting unit 10 such that the center point of the shade 20h is located in substantially the same position as the lens 130.

The lower end of the supporting section 21 is supported by the surface of the base 40 and the upper end of the supporting section 21 supports an overlapping portion of the shade 20h. The supporting section 21 supports a base 70b and a vertex 70t of the mirror surface 70.

The mirror surface 70 is supported by the supporting section 21 to be located right above the lens 130. The lower surface of the mirror surface 70 is set in a direction tilting in the horizontal direction by an angle set in advance (e.g., 45 degrees) from the direction of the optical axis of the lighting unit 10. The direction of a video projected by the lighting unit 10 changes from a projecting direction (e.g., 90 degrees).

The lower surface of the mirror surface 70 reflects a video projected from the top of the lighting unit 10 (indicated by a broken line in FIG. 12B) and projects the reflected video on the side surface on the inside of the shade 20h. A direction in which the video is provided is substantially perpendicular to the side surface on the inside of the shade 20h. A video user can visually recognize the video displayed on the side surface of the shade 20h.

In this modification, a prism (not shown in the figure) may be used instead of the mirror surface 70 as the projecting-direction converting section to change the direction in which the video is projected. Since the member for changing the direction in which the video is projected is provided in this way, it is possible to relax limitation on a positional relation between the lighting unit 10 and the shade 20h and increase a degree of freedom of design of the entire lighting device 1h.

Another Configuration Example "i" of the Lighting Device

Another configuration example of the lighting device 1 (a lighting device 1i) is explained. In the lighting device 1i, components same as the components of the lighting device 1 are denoted by the same reference numerals and signs.

Figure 13:
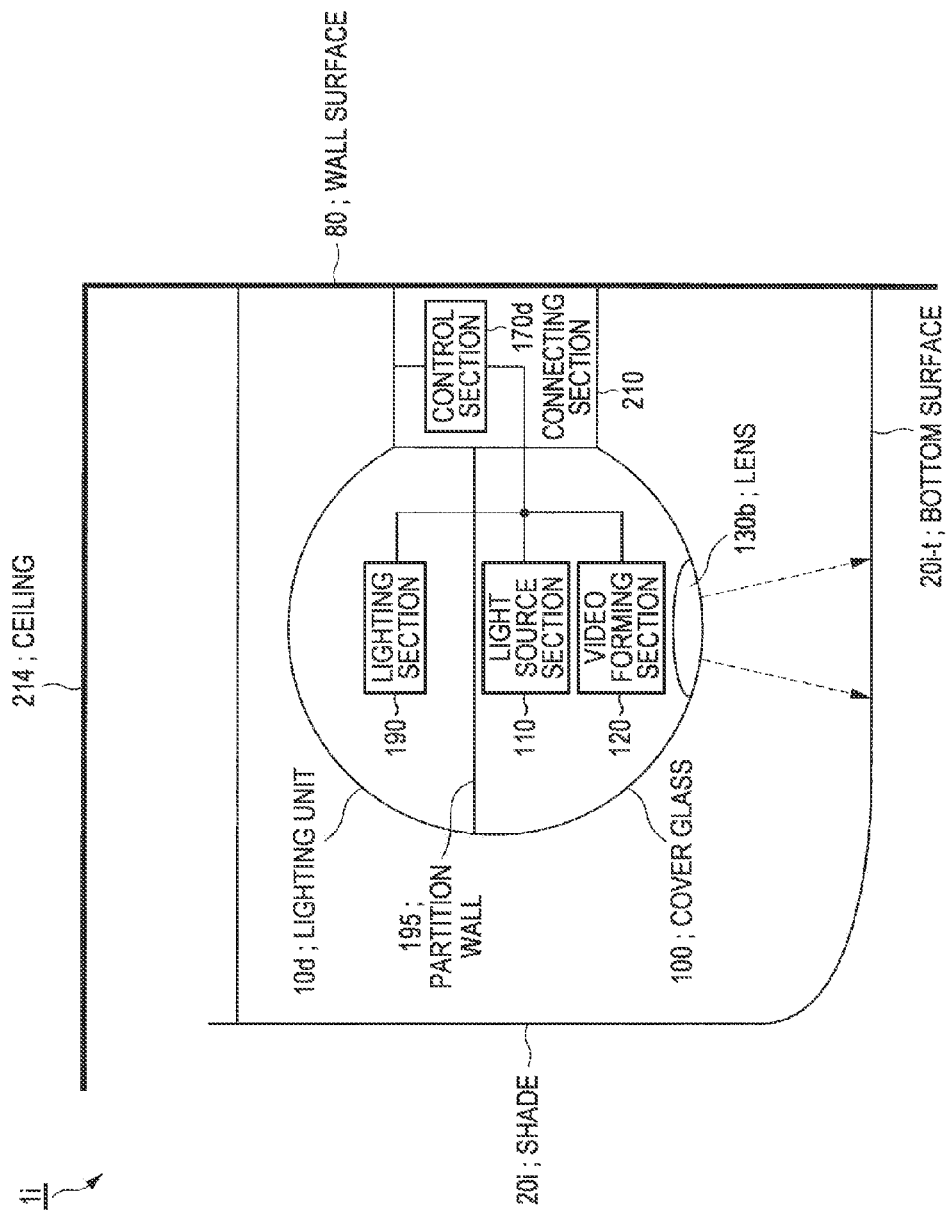
FIG. 13 is a schematic diagram showing the configuration of the lighting device according to the embodiment.

FIG. 13 is a schematic diagram showing the configuration of the lighting device 1i according to this embodiment.

The lighting device 1i includes the lighting unit 10d and a shade 20i respectively instead of the lighting unit 10d and the shade 20 of the lighting device 1 (FIGS. 1A and 1B). One surface of the connecting section 210 is fixed to a wall surface 80.

The terminal end of the shade 20i is fixed to the wall surface 80. As the shape of the shade 20i, the lower left surface is smoothly rounded, the bottom surface is parallel to the horizontal plane, and the upper surface is opened. The entire lighting unit 10d is embedded in the space on the inside of the shade 20i.

The optical axis of the lighting section 190 faces upward. The lighting section 190 radiates light upward. The optical axis of the video forming section 120 faces downward. A video projected by the video forming section 120 is projected on the inside of the bottom surface of the shade 20i passing through the lens 130b. Consequently, the user can visually recognize, from below, the video displayed on the bottom surface of the shade 20i.

A conductor wire (not shown in the figure) may be provided on the wall surface 80 to transmit electric power and a video signal between the operation input section 50 and the connecting section 210 and between the video input section 60 and the connecting section 210. Further, the transmission of the video signal may be performed by radio and the wire may be omitted.

In this modification, with the configuration explained above, light radiated upward is reflected on the ceiling 214 and the reflected light is irradiated to the entire room and, on the other hand, the video is displayed on the bottom surface of the shade 20i. Therefore, in this modification, display of indirect lighting and the video are realized. The user can view the video under a comfortable lighting environment.

In the example explained above, in FIGS. 6A and 6B, the lighting unit 10b is suspended from the indoor ceiling 214 and arranged such that the distal end of the lighting unit 10b is connected to face downward. However, in this embodiment, lighting units having other configurations, for example, the lighting units 10, 10a, 10c, 10d, and 10e may be set such that the distal ends of the lighting units or the direction in which the video formed by the video forming section 120 is projected faces downward.

Control of a Lighting Function and a Video Displaying Function

Control of a lighting function and a video displaying function in the lighting device 1 according to this embodiment is explained.

In an example explained below, the lighting device 1 includes the lighting unit 10b (FIG. 5).

Figure 14:
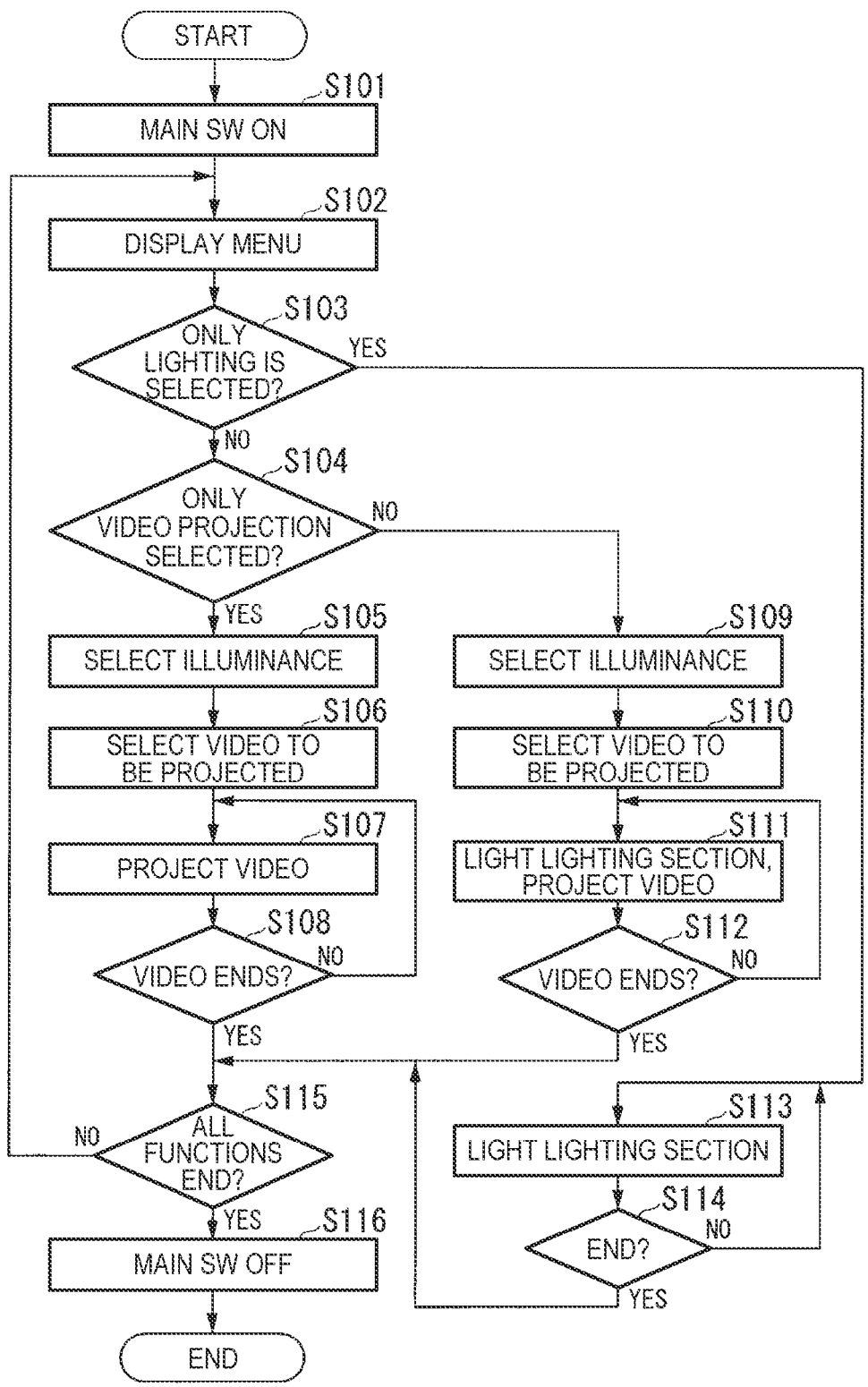
FIG. 14 is a flowchart for explaining processing related to control of a lighting function and a video displaying function according to the embodiment.

FIG. 14 is a flowchart for explaining processing related to the control of the lighting function and the video displaying function according to this embodiment.

(Step S101) The operation input section 50 receives an operation input through the main switch included in the lighting device 1. Consequently, a switch circuit of a power supply circuit is closed via the control section 170 and electric power supplied from the outside is supplied to the lighting unit 10b (main SW ON). Thereafter, the processing proceeds to step S102.

(Step S102) The control section 170 reads out menu information, which is information indicating a list of lighting functions of the lighting device 1, from a storing section (not shown) included in the control section 170 and displays a menu information based on the read-out menu information on a display section (e.g., a display; not shown in the figure) (menu display). Thereafter, the processing proceeds to step S103.

(step S103) The control section 170 determines whether only an operation input related to lighting of a light among operation inputs received by the operation input section 50 is selected. When it is determined that only the operation input related to the lighting of the light is selected (YES in step S103), the processing proceeds to step S113. When it is determined that an operation input related to video projection is selected (NO in step S103), the processing proceeds to step S104.

(Step S104) The control section 170 determines whether only the operation input related to video projection among the operation inputs received by the operation input section 50 is selected. When it is determined that only the operation input related to video projection is selected (YES in step S104), the processing proceeds to step S105. When it is determined that the operation input related to lighting of the light is selected (NO in step S104), the processing proceeds to step S109.

(Step S105) When an operation input related to illuminance of the light source section 110 is included in the operation inputs received by the operation input section 50, the control section 170 selects the illuminance indicated by the operation input. The illuminance of the light source section 110 can be controlled on the basis of the number of light emitting bodies included in the light source section 110 and a voltage or an electric current supplied to the light emitting bodies. When the operation input related to the illuminance of the light source section 110 is not included, the control section 170 uses illuminance set in advance. Thereafter, the processing proceeds to step S106.

(Step S106) When an operation input for identifying a video signal output to the video forming section 120 (equivalent to the video signal supply control signal explained above) is included in the operation inputs received by the operation input section 50, the control section 170 selects the video signal related to the operation input. The video signal is identified using, for example, a channel of an input terminal or a name of a file configured by the video signal (a file name indicating a title or the like of a movie or a program). For example, a video signal based on a broadcast wave or a video signal output by a recording and reproducing device can be identified using a channel of an input terminal. For example, a video signal related to a file name can be identified using the file name. Thereafter, the processing proceeds to step S107.

(Step S107) The control section 170 causes the light source section 110 to radiate light at the selected illuminance and causes the video forming section 120 to project a video related to the selected video signal. After time set in advance (e.g., one second) elapses, the processing proceeds to step S108.

(Step S108) The control section 170 determines whether the projection of the video ends. For example, when an operation input received by the operation input section 50 is a stop signal indicating a stop of the projection of the video or when readout and reproduction of a video signal reach the end of the video signal, the control section 170 determines that the projection of the video ends. When it is determined that the projection of the video does not end (NO in step S108), the processing returns to step S107. When it is determined that the projection of the video ends (YES in step S108), the processing proceeds to step S115.

(Step S109) When the operation input related to illuminance of the light source section 110 is included in the operation inputs received by the operation input section 50, the control section 170 selects each of illuminances indicated by the operation input. When the operation input related to illuminance of the light source section 110 is not included, the control section 170 uses each of illuminances set in advance. Thereafter, the processing proceeds to step S110.

(Step S110) When the operation input for identifying a video signal output to the video forming section 120 is included in the operation inputs received by the operation input section 50, the control section 170 selects the video signal related to the operation input. The processing proceeds to step S111.

(Step S111) The control section 170 supplies electric power to the light source section 110 and causes the light source section 110 to radiate light at the selected illuminance and causes the video forming section 120 to project a video related to the selected video signal. The control section 170 supplies electric power to the lighting section 190 and causes the lighting section 190 to radiate light. After time set in advance (e.g., one second) elapses, the processing proceeds to step S112.

(Step S112) The control section 170 determines whether the projection of the video ends. When it is determined that the projection of the video does not end (NO in step S112), the processing returns to step S111. When it is determined that the projection of the video ends (YES in step S112), the processing proceeds to step S115.

(Step S113) The control section 170 supplies electric power to the light source section 110 and causes the light source section 110 to radiate light. The control section 170 causes the lighting section 190 to radiate light at the selected illuminance (lights the lighting section 190). After time set in advance (e.g., one second) elapses, the processing proceeds to step S114.

(Step S114) The control section 170 determines whether to end the radiation of the light (extinguish the lighting section 190). For example, when an operation input received by the operation input section 50 is an extinguishing signal indicating extinguishing, the control section 170 determines to extinguish the lighting section 190. When it is determined not to extinguish the lighting section 190 (No in step S114), the processing returns to step S113. When it is determined to extinguish the lighting section 190 (YES in step S114), the processing proceeds to step S115.

(Step S115) The control section 170 determines whether all functions that the lighting unit 10b can perform end. All the functions are, in the example shown in FIG. 14, projection of a video by the light source section 110 and the video forming section 120 and lighting of the lighting section 190. When it is determined that all the functions do not end (NO in step S115), the processing returns to step S102. When it is determined that all the functions end (YES in step S115), the processing proceeds to step S102.

(Step S116) The control section 170 opens the main switch and stops the supply of the electric power to the lighting unit 10b from the outside (main SW OFF). Thereafter, the control section 170 ends the processing.

In this embodiment, if the lighting device 1 includes a lighting unit including the lighting section 190 separately from the light source section 110 like the lighting unit 10b, for example, the lighting unit 10c or the lighting unit 10d, the control section 170 can perform the processing shown in FIG. 14.

If the lighting device 1 includes a lighting unit not separately including the lighting section 190, for example, the lighting unit 10, the lighting unit 10a, or the lighting unit 10e, in FIG. 14, the control section 170 can execute the processing excluding the processing related to steps S105 to S108 in FIG. 14.

As explained above, in this embodiment, the lighting device 1 includes the lighting unit 10 or the like and the shade 20 or the like that blocks a part of light from the lighting unit 10 or the like. The lighting unit 10 or the like radiates light, modulates the radiated light on the basis of video information, projects a video on the shade 20 or the like, supplies electric power to the light source section 110, and supplies video information to the video forming section 120.

Consequently, in this embodiment, it is possible to control lighting and extinguishing according to the operation by the user. Further, it is possible to control projection of a video based on a selected video signal and a stop of the projection of the video. A reproduced video is projected on the shade 20 or the like and visually recognized by the user. Therefore, the user can view, with interest, a video based on an arbitrarily selected video signal. The lighting device 1 is useful as, for example, a part of furniture in a living room or a bedroom.

Second Embodiment

A second embodiment of the invention is explained. Components same as the components in the first embodiment are denoted by the same reference numerals and signs. The explanation in the first embodiment applies to the second embodiment.

Figure 15:
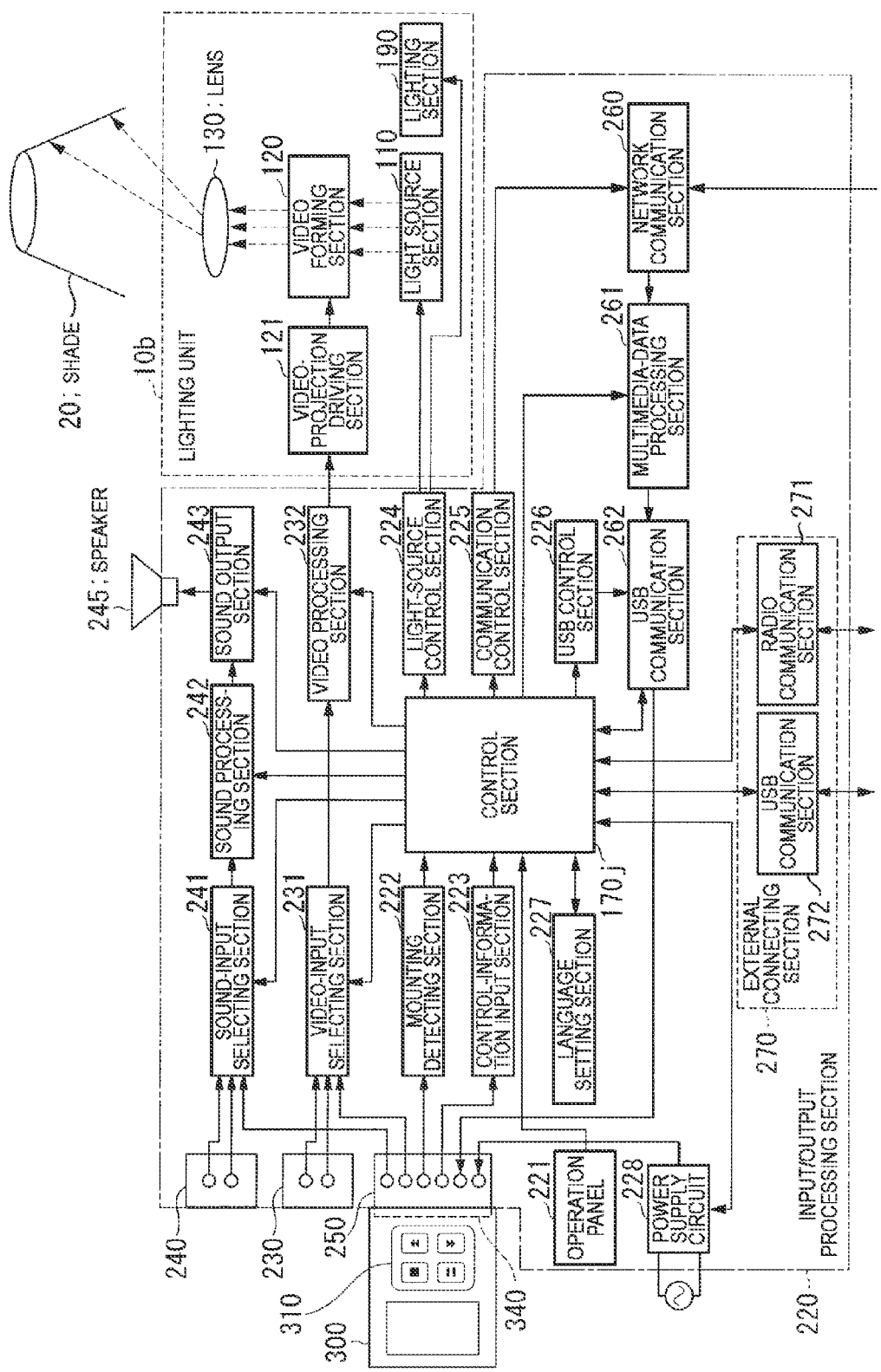
FIG. 15 is a schematic diagram showing the configuration of a lighting device according to a second embodiment of the invention.

FIG. 15 is a schematic diagram showing the configuration of a lighting device 2 according to this embodiment.

The lighting device 2 according to this embodiment includes an input/output processing section 220. The input/output processing section 220 includes a housing section 250 configured to detachably house a communication device 300. Like the operation input section 50, the input/output processing section 220 receives, using the communication device 300, operation inputs related to presence or absence of lighting of the lighting section 190, selection of a video signal, and reproduction of a video and a stop of the reproduction of the video. When the communication device 300 is housed in the housing section 250, a control section 170j controls, on the basis of an operation input received by the communication device 300, presence or absence of lighting of the lighting section 190, selection of a video signal to be output to the video forming section 120, or reproduction of a video and a stop of the reproduction of the video.

The communication device 300 has, for example, a function of acquiring and storing a video signal, a function of outputting a video signal, a function of receiving an operation input, and a function of displaying a video. As a specific example, various devices such as a portable terminal device and a multi-function cellular phone (a so-called smart phone) may be used. In this embodiment, a terminal device used in general such as the portable terminal device or the multi-function cellular phone is used as the communication device 300.

The input/output processing section 220 includes an operation panel 221 functioning as the operation input section 50, a mounting detecting section 222, a control-information input section (a serial-interface communication section) 223, a light-source control section 224, a communication control section 225, a USB control section 226, a language setting section 227, a power supply circuit 228, a video input terminal group (a video input section) 230 functioning as the video input section 60, a video-input selecting section 231, a video processing section 232, a sound input terminal group (a sound input section) 240, a sound-input selecting section 241, a sound processing section 242, a sound output section 243, a speaker 245, a housing section (a lighting-device side connector) 250, a network communication section 260, a multimedia-data processing section 261, a USB communication section 262, an external connection section 270, and the control section 170j. In FIG. 15, the communication device 300 is mounted on the housing section 250. The lighting unit 10 includes a video-projection driving section 121 besides the light source section 110, the video forming section 120, and the lens 130.

The control section 170j outputs signals explained below to the sections and controls the operations of the sections on the basis of an input operation input signal to realize lighting/extinguishing of a light, selection of a video signal, projection of a video, and the like. The control section 170j is, for example, a CPU (Central Processing Unit).

The operation panel 221 includes a plurality of keys and the like for receiving an operation input by a user. Examples of the keys included in the operation panel 221 include a "power key" for performing ON and OFF of a power supply, an "input switching key" for switching an input terminal to which a video signal and the like are input, a "lighting key" for switching lighting and extinguishing of the lighting section 190, and a "projection key" for instructing projection of a video by the video forming section 120.

When the user operates the operation panel 221, the operation panel 221 outputs an operation input signal corresponding to an operation input by the user to the control section 170j. The operation panel 221 may include a remote-control-signal transmitting section (not shown in the figure). The input/output processing section 220 may include a remote-control-signal receiving section (not shown in the figure). The remote-control-signal transmitting section transmits the operation input signal to the remote-control-signal receiving section as a radio wave. The remote-control-signal receiving section receives the operation input signal from the remote-control-signal transmitting section and outputs the received operation input signal to the control section 170j. The operation panel 221 may include a display section for displaying the menu explained above.

The mounting detecting section 222 is connected to a mounting information input terminal included in the housing section 250. The mounting detecting section 222 detects whether the communication device 300 is mounted on the housing section 250. The mounting detecting section 222 generates a mounting detection signal indicating whether the communication device 300 is mounted and outputs the generated mounting detection signal to the control section 170j.

The control-information input section 223 is connected to a control information input terminal included in the housing section 250. A control signal is input to the control-information input section 223 from the communication device 300 using, for example, a serial interface. The control-information input section 223 outputs the input control signal to the control section 170j. Examples of the control signal input to the control-information input section 223 include a media operation input signal based on an operation input received by an operation input section included in the communication device 300 and a projection start signal indicating a start of projection of a video based on a timing section included in the communication device 300. Besides, the control signal includes, for example, language information indicating a language used by the communication device 300 for display and reception request information for requesting reception of a video signal, i.e., multimedia data from a network.

The light-source control section 224 controls the supply of electric power to the light source section 110 and a stop of the supply of electric power on the basis of a light source control signal input from the control section 170j. Consequently, it is possible to perform lighting and extinguishing by the light source section 110 and change illuminance.

The communication control section 225 transmits a communication control signal input from the control section 170j to the network communication section 260 and controls transmission and reception of a data signal performed using a network (not shown in the figure) connected to the network communication section 260.

The USB control section 226 outputs a USB control signal input from the control section 170j to the USB communication section 262 and controls USB communication with the communication device 300.

The language setting section 227 includes, for example, a nonvolatile memory. The language setting section 227 stores, in the memory in advance, menu information and language setting values for identifying languages used in displaying a message and the like in an operation input. The control section 170j reads and writes a language setting value stored in the language setting section 227.

Electric power, for example, alternating-current 100V commercial power is supplied to the power supply circuit 228 from the outside. The power supply circuit 228 converts supplied alternating-current electric power into direct-current electric power having a voltage set in advance and supplies the converted electric power to the sections of the lighting device 1. The power supply circuit 228 can change, on the basis of a power control signal input from the control section 170j, main power required for projection of a video, reproduction of sound, and the like and standby power in the supply of the main power. The standby power is electric power required for supplying the main power again when the supply of the main power is stopped. Usually, the standby power is particularly smaller than the main power (e.g., about 1/1000). The power supply circuit 228 is connected to a power supply terminal included in the housing section 250. The power supply circuit 228 supplies electric power to the communication device 300.

The video input terminal group 230 includes a plurality of video input terminals to which video signals of various forms can be input from an external video supply apparatus (not shown in the figure) such as a video reproducing apparatus or a personal computer. The video input terminal group 230 outputs each of the video signals input from the video input terminals to the video-input selecting section 231.

The video-input selecting section 231 selects, on the basis of a video selection signal input from the control section 170j, one video signal among video signals input from the plurality of video input terminals included in the video input terminal group 230 and the video input terminal included in the housing section 250 (i.e., video signals output from the communication device 300) and video signals input from the control section 170j. The video-input selecting section 231 outputs the selected video signal to the video processing section 232.

The video processing section 232 converts the video signal input from the video-input selecting section 231 into driving voltage data indicating a driving voltage applied to pixels included in the video forming section 120. The driving voltage data indicates, for example, tones of the pixels of the video forming section 120. The video processing section 232 may perform, on the basis of a video adjustment signal input from the control section 170j, concerning the converted driving voltage data, processing related to various kinds of image quality adjustment such as adjustment of brightness, contrast, sharpness, and a tint and gamma correction. The video processing section 232 may superimpose, on the converted driving voltage data, OSD driving voltage data based on an OSD image signal indicating an OSD (on screen display) image. The video processing section 232 outputs the converted or adjusted driving voltage data to the video-projection driving section 121.

The video-projection driving section 121 applies a voltage based on the driving voltage data input from the video processing section 232 to each of the pixels included in the video forming section 120. Consequently, the video forming section 120 forms an image based on the selected video signal. The formed image is projected on the shade 20 passing through the lens 130.

The sound input terminal group 240 includes a plurality of sound input terminals to which sound signals can be input from an external sound supply apparatus (not shown in the figure) such as a video reproducing apparatus or a personal computer. The sound input terminal group 240 outputs the sound signals respectively input to the sound input terminals to the sound-input selecting section 241.

The sound-input selecting section 241 selects, on the basis of a sound selection signal input from the control section 170j, one sound signal out of sound signals input from the plurality of sound input terminals and a sound input terminal included in the housing section 250 (i.e., sound signals output by the communication device 300) or sound signals input from the control section 170j. The sound-input selecting section 241 outputs the selected sound signal to the sound processing section 242.

The sound processing section 242 subjects, on the basis of a sound adjustment signal input from the control section 170j, the sound signal input from the sound-input selecting section 241 to processing for adjusting an output characteristic of the sound signal. The sound processing section 242 outputs the sound signal subjected to the processing to the sound output section 243.

The sound output section 243 amplifies the sound signal input from the sound processing section 242 and outputs the amplified sound signal to the speaker 245. The speaker 245 reproduces sound based on the sound signal input from the sound output section 243.

The housing section 250 includes a plurality of input/output terminals for inputting and outputting data to and from the operation input device 300. As the input/output terminals included in the housing section 250, there are, for example, a sound input terminal for inputting a sound signal, a video input terminal for inputting a video signal, a mounting detection input terminal for inputting a mounting detection signal indicating whether the communication device 300 is mounted, an operation input terminal for inputting an operation input signal from the communication input device 300, a USB terminal for outputting multimedia data from the USB communication section 262, and a power supply terminal for outputting electric power from the power supply circuit 228.

When the communication device 300 is mounted on the housing section 250, a connector 340 of the communication device 300 and a connector of the housing section 250 fit with each other. Various signals such as a video signal, a sound signal, and an operation input signal can be input and output via the input/output terminals. Further, electric power can be supplied from the lighting device 2 to the communication device 300.

The network communication section 260 is connected to a wide area network such as the Internet by wire. The network communication section 260 transmits and receives data on the basis of a communication control signal input from the communication control section 225. The network communication section 260 receives multimedia data including a video signal and a sound signal from a communication apparatus (not shown in the figure) such as a server apparatus in a remote location and outputs the received multimedia data to the multimedia-data processing section 261. The network communication section 260 is connected to a network and performs communication using, for example, a TCP/IP protocol.

The multimedia-data processing section 261 accumulates the multimedia data input from the network communication section 260 as a file on the basis of a multimedia data processing signal input from the control section 170j. The multimedia-data processing section 261 performs conversion processing to convert the accumulated multimedia data into a format for enabling USB communication and outputs the processed multimedia data to the USB communication section 262.

The USB communication section 262 is a communication unit configured to perform communication conforming to the USB (Universal Serial Bus) standard. The USB communication section 262 is connected to the USB terminal of the housing section 250. The USB standard is one of serial bus standards for connecting peripheral equipment to a computer. The USB terminal of the housing section 250 is connected to a USB receiving section (not shown in the figure) on the inside of the communication device 300 via the connector 340 of the communication device 300. The USB communication section 262 outputs the multimedia data input from the multimedia-data processing section 261 to the communication device 300 according to the USB control signal input from the USB control section 226.

The external connection section 270 includes a radio communication section 271 and a USB communication section 272.

The radio communication section 271 is connected to a wireless network such as a public wireless communication network or a small wireless communication network (a wireless LAN (Local Area Network). The radio communication section 271 transmits and receives data by radio. The radio communication section 271 receives multimedia data including a video signal and a sound signal from a communication apparatus (not shown in the figure) such as a server apparatus in a remote location by radio and down-converts the received multimedia data from a radio frequency band to a base frequency band. The radio communication section 271 subjects the multimedia data in the base frequency band to analog-to-digital (A/D) conversion to convert the multimedia data into digital multimedia data. The radio communication section 271 outputs the digital multimedia data to the control section 170j. The control section 170j outputs the video signal and the sound signal included in the multimedia data input from the radio communication section 271 respectively to the video-input selecting section 231 and the sound-input selecting section 241.

The USB communication section 272 includes a USB terminal. The USB communication section 272 performs transmission and reception of data between the USB communication section 272 and an apparatus such as a video camera or a personal computer connected to the USB terminal of the USB communication section 272. The USB communication section 272 outputs multimedia data input from the USB terminal of the USB communication section 272 to the control section 170j. The control section 170j outputs a video signal and a sound signal included in the multimedia data input from the USB communication section 272 respectively to the video-input selecting section 231 and the sound-input selecting section 241. The USB communication section 272 may input a video signal indicating not only a moving image but also a still image (a photograph, etc.).

The communication device 300 includes a communication section configured to access a network and receives video content (a video signal) and a sound signal through the accessed network and an input/output interface configured to directly input and output a video signal and a sound signal. The communication device 300 includes a storing section configured to store the received or input video signal or the sound signal and an operation input section (an operation panel 310) configured to receive an operation input by the user. The communication section may download a video signal and a sound signal from a server apparatus on the network or may receive a video signal and a sound signal from a communication partner's communication apparatus. The communication device 300 includes a control section configured to select the stored video signal or sound signal on the basis of the received operation input and controls whether the selected video signal or sound signal is output, whether a video is reproduced on the basis of the selected video signal, or whether sound is reproduced on the basis of the selected sound signal.

The communication device 300 receives multimedia data from the USB terminal included in the housing section 250 and stores the received multimedia data in a storage medium (not shown in the figure) incorporated therein. As the incorporated storage medium, for example, a hard disk drive or a flash memory can be adopted.

In a state in which the communication device 300 is mounted on the housing section 250, for example, when the user operates the operation panel 310 in order to perform lighting of a light or reproduction of a video, the communication device 300 generates an operation input signal indicating the supply of electric power. When the user operates the operation panel 310 in order to perform reproduction of a video, the communication device 300 generates an operation input signal indicating the supply of a video signal. When the user operates the operation panel 310 in order to select a video that the user is about to view, the communication device 300 generates an operation input signal indicating a video input terminal (channel) to which a video signal indicating the video to be selected is input or a file of the video signal. The communication device 300 outputs the operation input signal indicating the supply of the video signal to the lighting device 2 via the connector 340. Consequently, video light is projected by the lighting unit 10b. In the communication device 300, reproduction of a video related to the video signal in the communication device 300 may be performed simultaneously with the output of the video signal to the lighting device 2 or does not have to be performed.

Control of a Lighting Function and a Video Display Function

Control of a lighting function and a video display function in the lighting device 2 according to this embodiment is explained.

In an example explained below, the lighting device 2 includes the lighting unit 10*b* (FIG. 5) and the operation input device 300 is mounted on the hosing section 250.

Figure 16:
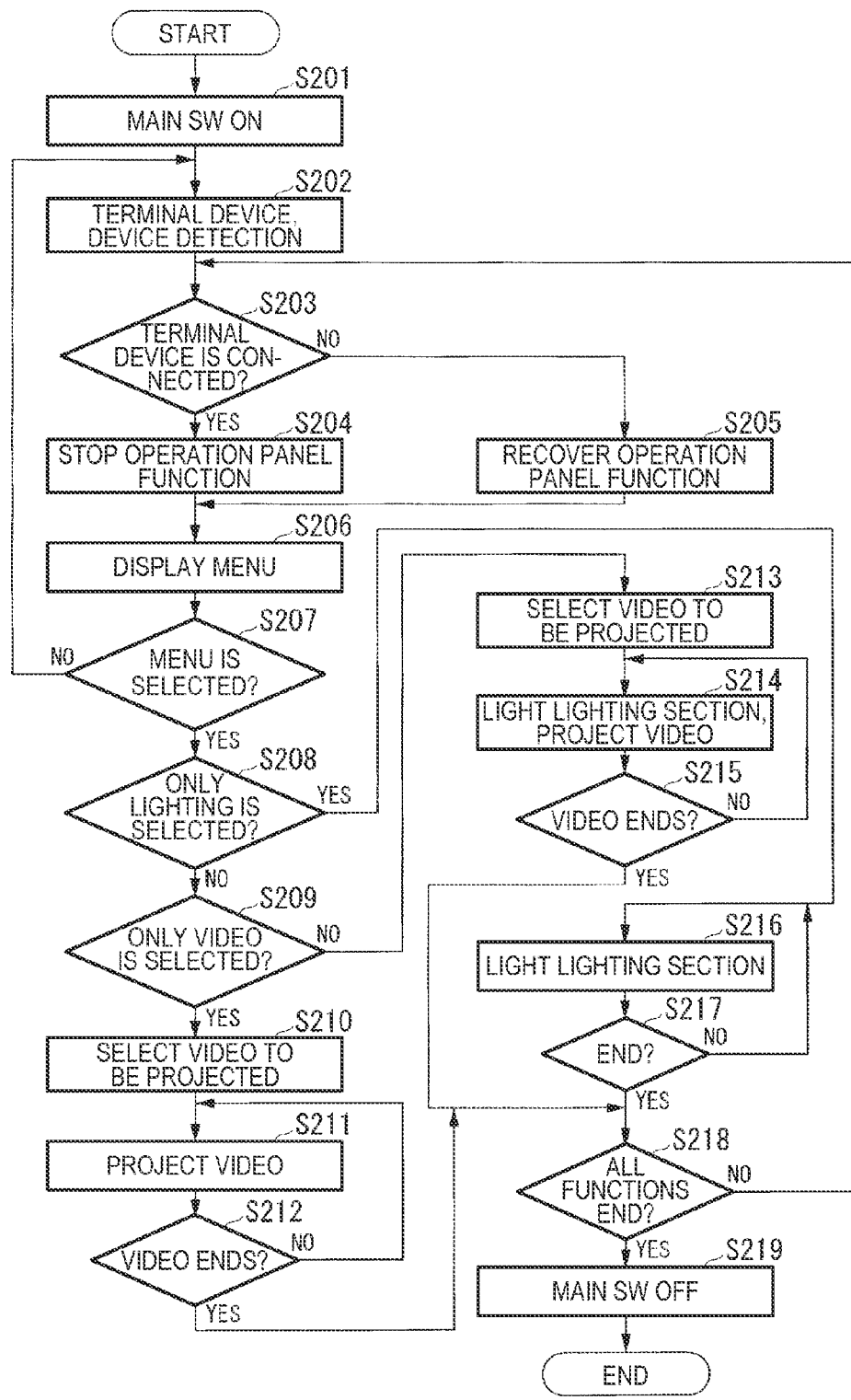
FIG. 16 is a flowchart for explaining processing related to control of a lighting function and a video displaying function according to the invention.

FIG. 16 is a flowchart for explaining processing related to control of a lighting function and a video displaying function according to this embodiment.

(Step S201) A main switch included in the lighting device 2 receives an operation input by the user, closes the power supply circuit 228 via the control section 170*j*, and starts the supply of alternating-current power supplied from the outside to the power supply circuit 228 (main SW ON). The power supply circuit 228 converts the supplied alternating-current power into direct-current power and supplies the converted direct-current power to the sections of the lighting device 2. Thereafter, the processing proceeds to step S202.

(Step S202) The amounting detecting section 222 detects whether the communication device 300 is mounted on the housing section 250 (terminal device detection), generates a mounting detection signal indicating whether the communication device 300 is mounted, and outputs the generated mounting detection signal to the control section 170*j*. The control section 170*j* detects various devices connected to the lighting device 2 (device detection). Examples of the devices to be detected include devices connected to the radio communication section 271 and devices connected to the USB communication section 272. Thereafter, the processing proceeds to step S203.

(Step S203) The control section 170*j* determines whether the mounting detection signal input from the mounting detecting section 222 indicates that the communication device 300 is mounted on the housing section 250. When the mounting detection signal indicates that the communication device 300 is mounted on the housing section 250 (YES in step S203), the processing proceeds to step S204. When the mounting detection signal indicates that the communication device 300 is not mounted on the housing section 250 (NO in step S203), the processing proceeds to step S205.

(Step S204) The control section 170*j* stops the function of the operation panel 221 and receives an operation input from the communication device 300. For example, the control section 170*j* stops an input of an operation input signal from the operation panel 221 and starts an input of a control signal from the mounting detecting section 222. Thereafter, the processing proceeds to step S205.

(Step S205) When the function of the operation panel 221 is stopped, the control section 170*j* recovers the function of the operation panel 221 and stops the operation input from the communication device 300. For example, the control section 170*j* receives an input of an operation input signal from the operation panel 221 and stops an input of a control signal from the mounting detecting section 222. Thereafter, the processing proceeds to step S206.

(Step S206) The control section 170*j* reads out menu information, which is information indicating a list of lighting functions of the lighting device 2, from a storing section (not shown in the figure) and displays a menu based on the read-out menu information on a display section of the operation panel 221 or the communication device 300 (menu display). Thereafter, the processing proceeds to step S207.

(Step S207) The control section 170*j* determines whether an operation input related to selection of a menu is received (menu selection). When it is determined that the operation input related to selection of a menu is received (YES in step S207), the processing proceeds to step S208. When it is determined that the operation input related to selection of a menu is not received (NO in step S207), the processing proceeds to step S202.

(Step S208) The control section 170*j* determines whether an operation input signal input from the operation panel 221 or the communication device 300 includes only an operation input signal related to lighting of a light. When it is determined that the input operation input signal includes only the operation input signal related to lighting of a light (YES in step S208), the processing proceeds to step S216. When it is determined that the input operation input signal includes an operation input signal related to video projection (NO in step S208), the processing proceeds to step S209.

(Step S209) The control section 170*j* determines whether the operation input signal input from the operation panel 221 or the communication device 300 includes only the operation input signal related to video projection. When it is determined that the input operation input signal includes only the operation input signal related to video projection (YES in step S209), the processing proceeds to step S209. When it is determined that the input operation input signal includes the operation input signal related to lighting of a light as well (NO in step S209), the processing proceeds to step S213.

(Step S210) The control section 170*j* extracts a video selection signal for selecting a video signal from the operation input signal input from the operation panel 221 or the communication device 300 and outputs the extracted video selection signal to the video-input selecting section 231. The video-input selecting section 231 selects, on the basis of the video selection signal input from the control section 170*j*, one video signal among video signals input from the plurality of video input terminals included in the video input terminal group 230 and the video input terminal included in the housing section 250 and video signals input from the control section 170*j*. The video-input selecting section 231 outputs the selected video signal to the video processing section 232. Thereafter, the processing proceeds to step S211.

(Step S211) The video processing section 232 converts the video signal input from the video-input selecting section 231 into driving voltage data and outputs the converted driving voltage data to the video-projection driving section 121. The video-projection driving section 121 applies a voltage based on the driving voltage data input from the video processing section 232 to each of the pixels included in the video forming section 120. Consequently, the video forming section 120 forms an image based on the selected video signal. The formed image is projected. Thereafter, the processing proceeds to step S212.

(Step S212) The video-input selecting section 231 determines whether the projection of the video ends. For example, a stop signal indicating a stop of the projection of the video is input to the video-input selecting section 231 from the control section 170*j* or when readout and reproduction of an input video signal reach the end of the video signal, the video-input selecting section 231 determines that the projection of the video ends.

The stop signal is a signal input to the control-information input section 223 from the operation panel 221 or the communication device 300 and output to the control section 170*j* as a part of control information. The control section 170*j* extracts the stop signal from the control information input to the control-information input section 223 and outputs the extracted stop signal to the video-input selecting section 231.

When it is determined that the projection of the video does not end (NO in step S212), the processing returns to step S211. When it is determined that the projection of the video ends (YES in step S212), the processing proceeds to step S218.

(Step S213) The control section 170*j* extracts a video selection signal for selecting a video signal from the operation input signal input from the operation panel 221 or the communication device 300 and outputs the extracted video selection signal to the video-input selecting section 231. The video-input selecting section 231 selects, on the basis of the video selection signal input from the control section 170*j*, one video signal among video signals input from the plurality of video input terminals included in the video input terminal group 230 and the video input terminal included in the housing section 250 and video signals input from the control section 170*j*. The video-input selecting section 231 outputs the selected video signal to the video processing section 232. Thereafter, the processing proceeds to step S214.

(Step S214) The video processing section 232 converts the video signal input from the video-input selecting section 231 into driving voltage data and outputs the converted driving voltage data to the video-projection driving section 121. The video-projection driving section 121 applies a voltage based on the driving voltage data input from the video processing section 232 to each of the pixels included in the video forming section 120. Consequently, an image is projected on the shade 20.

The control section 170*j* generates a light source control signal indicating lighting of the lighting section 190 and outputs the generated light source control signal to the light-source control section 224. The light-source control section 224 starts the supply of electric power to the lighting section 190 (see FIG. 5) on the basis of the light source control signal input from the control section 170*j*. Consequently, the lighting section 190 is lit. Thereafter, the processing proceeds to step S215.

(Step S215) The video-input selecting section 231 determines whether the projection of the video ends.

When it is determined that the projection of the video does not end (NO in step S215), the processing returns to step S214. When it is determined that the projection of the video ends (YES in step S215), the processing proceeds to step S218.

(Step S216) The control section 170*j* generates a light source control signal indicating lighting of the lighting section 190 and outputs the generated light source control signal to the light-source control section 224. The light-source control section 224 starts the supply of electric power to the lighting section 190 (see FIG. 5) on the basis of the light source control signal input from the control section 170*j*. Consequently, the lighting section 190 is lit. Thereafter, the processing proceeds to step S217.

(Step S217) The control section 170*j* determines whether a control signal is input from the control-information input section 223 or the communication device 300 and an operation input signal related to extinguishing of a light is included in the input control signal. When the operation input signal related to extinguishing of a light is included in the input control signal (YES in step S217), the control section 170*j* generates a light source control signal indicating extinguishing of the lighting section 190 and outputs the generated light source control signal to the light-source control section 224. The light-source control section 224 stops the supply of electric power to the lighting section 190 (see FIG. 5) on the basis of the light source control signal input from the control section 170*j*. Consequently, the radiation of light from the lighting section 190 is stopped and the lighting section 190 is extinguished. Thereafter, the processing proceeds to step S218. When the operation input signal related to extinguishing of a light is not included in the input control signal (NO in step S217), the processing returns to step S216.

(Step S218) The control section 170*j* determines whether all functions of the lighting device 2 end. All the functions are, in the example shown in FIG. 15, projection of a video by the video forming section 120 and lighting of the lighting section 190 (see FIG. 5). When it is determined that all the functions end (YES in step S218), the processing proceeds to step S220. When it is determined that all the functions do not end (NO in step S218), the processing returns to step S203.

(Step S219) The control section 170*j* opens the main switch (not shown in the figure) and stops the supply of the alternating-current electric power from the outside (main SW OFF). Thereafter, the control section 170*j* ends the processing.

In this embodiment, if the lighting device 2 includes a lighting unit including the lighting section 190 separately from the light source section 110 like the lighting unit 10*b*, for example, the lighting unit 10*c* or the lighting unit 10*d*, the control section 170*j* can perform the processing shown in FIG. 16.

If the lighting device 2 includes a lighting unit not separately including the lighting section 190, for example, the lighting unit 10, the lighting unit 10*a*, or the lighting unit 10*e*, in FIG. 16, the control section 170*j* can execute the processing excluding the processing related to steps S214 to S216 in FIG. 16.

Consequently, in this embodiment, the housing section 250 detachably houses the communication device 300 that accumulates a video signal. The control section 170*j* switches whether the video signal is output from the communication device 300 to the video forming section 120. By using the video signal acquired by the communication device 300 and the other functions included in the communication device 300, the user can more easily perform lighting and viewing of a video. This is useful as, for example, entertainment in a living room or a bedroom.

A part of the lighting devices 1 and 2 in the embodiments explained above, for example, the control sections 170 and 170*j*, the mounting detecting section 222, the control-information input section 223, the light-source control section 224, the communication control section 225, the USB control section 226, the video-input selecting section 231, the video processing section 232, the sound-input selecting section 241, the sound processing section 242, the multimedia-data processing section 261, and the USB communicating section 262 may be realized by a computer. In that case, a computer program for realizing a control function for the sections may be recorded in a computer-readable recording medium. The sections may be realized by causing a computer system to read the computer program recorded in the recording medium and executing the computer program. The "computer system" is a computer system incorporated in the lighting devices 1 and 2 and includes an OS and hardware such as peripheral equipment. The "computer-readable recording medium" refers to portable media such as a flexible disk, a magneto-optical disk, a ROM, and a CD-ROM and a storage device such as a hard disk incorporated in the computer system. Further, the "computer-readable recording medium" includes a medium that dynamically retains the computer program for a short time like a communication line in transmitting the computer program via a network such as the Internet or a communication line such as a telephone line or a medium that retains the computer program for a fixed time like a volatile memory in a computer system that functions as a server or a client when the computer program is transmitted. The computer program may be a computer program for realizing a part of the functions explained above or may be a computer program that can realize the functions in combination with a computer program already recorded in the computer system.

A part or all of the lighting devices 1 and 2 in the embodiments may be realized as an integrated circuit such as an LSI (Large Scale Integration). The functional blocks of the lighting devices 1 and 2 may be individually formed as processors or may be formed as processors by integrating a part or all of the functional blocks. A method for circuit integration may be realized not only by the LSI but also by a dedicated circuit or a general-purpose processor. When a technique for circuit integration replacing the LSI emerges according to the progress of the semiconductor technology, an integrated circuit by the technique may be used.

The embodiments of the present invention are explained in detail above with reference to the drawings. However, a specific configuration is not limited to the configuration explained above. Various design changes and the like can be made without departing from the spirit of the present invention. For example, the lighting devices 1 and 2 may include any one of the lighting units 10, 10*a*, 10*b*, 10*c*, 10*d*, and 10*e* and any one of the shades 20, 20*f*, 20*g*, 20*h*, and 20*i*.

What is claimed is:

1. A lighting device comprising:
    a lighting unit; and
    an enclosure configured to cover a part or all of a periphery of the lighting unit and transmit light from the lighting unit, wherein
    the lighting unit includes:
        a light source section for lighting configured to radiate light;
        a video forming section configured to form video light obtained by modulating, on the basis of video information, light from a light source section for video formation configured integrally with or separately from the light source section for lighting and project the video light on the enclosure; and
        a light transmitting cover that encloses both the light source section and the video forming section
        wherein the video forming section has a lens disposed in one area of a surface of the light transmitting cover, the video forming section projecting the video light on the enclosure through the lens of the light transmitting cover.

2. The lighting device according to claim 1, wherein the lighting unit further includes a projecting-direction converting section configured to change a direction of the video light projected by the video forming section and project the video light on the enclosure.

3. The lighting device according to claim 1, wherein
    the light source section for lighting and the light source section for video formation are configured separately, and
    the lighting unit includes a partition wall section configured to partition a first space in which the light source section for video formation and the video forming section are housed and a second space in which the light source section for lighting is housed.

4. The lighting device according to claim 1, wherein the video forming section projects the video light in a direction different from a direction of light radiated as lighting by the light source section for lighting.

5. The lighting device according to claim 1, further comprising a control section configured to switch lighting or extinguishing of the light source section for lighting or a video signal supplied to the video forming section.

6. The lighting device according to claim 5, further comprising a housing section configured to detachably house a communication device that accumulates a video signal, wherein
    the control section switches whether the video signal is output from the communication device to the video forming section.

* * * * *